(12) United States Patent
Bennett et al.

(10) Patent No.: US 7,007,468 B1
(45) Date of Patent: Mar. 7, 2006

(54) CHARGE PUMP FOR A HYDROSTATIC TRANSMISSION

(75) Inventors: Michael L. Bennett, Sullivan, IL (US); John D. Scheier, Fitchburg, WI (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/869,445

(22) Filed: Jun. 16, 2004

Related U.S. Application Data

(60) Provisional application No. 60/483,375, filed on Jun. 27, 2003.

(51) Int. Cl.
*F16D 39/00* (2006.01)
*F04B 23/12* (2006.01)

(52) U.S. Cl. .............. 60/488; 417/206; 91/499
(58) Field of Classification Search ........... 60/488, 60/489; 91/499; 417/206
See application file for complete search history.

(56) References Cited

U.S. PATENT DOCUMENTS

| | | | |
|---|---|---|---|
| 3,202,101 A | 8/1965 | Tinker et al. | |
| 3,250,227 A | 5/1966 | Kouns | |
| 3,667,867 A | 6/1972 | Boydell et al. | |
| 3,669,568 A | 6/1972 | McLeod | |
| 3,690,789 A | 9/1972 | Spence | |
| 3,774,505 A | 11/1973 | McLeod | |
| 4,014,628 A | 3/1977 | Ruseff et al. | |
| 4,037,521 A | 7/1977 | McLeod | |
| 4,212,596 A | 7/1980 | Ruseff | |
| 4,223,594 A | 9/1980 | Gherner | |
| 4,281,971 A * | 8/1981 | Kouns | 417/205 |
| 4,366,672 A | 1/1983 | Claar et al. | |
| 4,934,253 A | 6/1990 | Berthold et al. | |
| 5,123,815 A | 6/1992 | Larkin et al. | |
| 5,176,066 A | 1/1993 | Hisanobu et al. | |
| 5,251,536 A | 10/1993 | Engel | |
| 5,495,713 A * | 3/1996 | Leker | 60/488 |
| 5,538,401 A | 7/1996 | Schaffner et al. | |
| 5,647,266 A | 7/1997 | Claas | |
| 6,022,198 A | 2/2000 | Hoffmeister | |
| RE36,807 E * | 8/2000 | Okada | 60/487 |
| 6,244,160 B1 | 6/2001 | Kunze | |
| 6,427,443 B1 * | 8/2002 | Smothers et al. | 60/488 |
| 6,629,822 B1 * | 10/2003 | Larkin et al. | 417/205 |
| 6,843,056 B1 * | 1/2005 | Langenfeld et al. | 60/488 |

* cited by examiner

*Primary Examiner*—Edward K. Look
*Assistant Examiner*—Michael Leslie
(74) *Attorney, Agent, or Firm*—Neal, Gerber & Eisenberg LLP

(57) ABSTRACT

A charge pump design for a hydraulic drive apparatus such as a hydrostatic transmission, integrated hydrostatic transaxle or pump having a rotatable pump cylinder block mounted in a sump and connected to a hydraulic circuit by means of a center section or the like. A fluid gallery for charge fluid is in communication with the hydraulic circuit and the charge pump is mounted adjacent to and is driven by the pump cylinder block to provide hydraulic fluid from the sump to the fluid gallery. The charge pump can be of many different styles such as a gerotor, a centrifugal pump or a flexible impeller style.

36 Claims, 36 Drawing Sheets

CHARGE PUMP FOR A HYDROSTATIC TRANSMISSION

HISTORY OF THE INVENTION

This application claims the benefit of U.S. Provisional App. No. 60/483,375, filed Jun. 27, 2003 which is incorporated herein in its entirety.

BACKGROUND OF THE INVENTION

This invention relates to hydraulic pumps and transmissions having a closed hydraulic circuit and in particular to a charge pump for use with hydraulic pumps, hydrostatic transmissions and the like.

The invention described herein can be used with hydraulic pumps, which may be a stand alone hydraulic unit such as is shown in commonly-owned U.S. Pat. Nos. 6,332,393 and 6,494,686, the terms of which are incorporated herein by reference. It can also be used with a hydrostatic transmission ("HST") comprising a pump and motor mounted in a common housing on a center block or center section. The invention can also be used with an integrated hydrostatic transmission ("IHT") wherein the axles and other gearing such as a differential may be included in the same housing as the hydrostatic transmission. Integrated hydrostatic transmission designs are depicted in commonly-owned U.S. Pat. Nos. 5,314,387 and 6,253,637, the terms of which are incorporated herein by reference.

SUMMARY OF THE INVENTION

It is understood by those of skill in the art that hydraulic devices such as those described above use a closed hydraulic circuit to transfer hydraulic fluid to and from the rotating cylinder blocks of the hydraulic pump and motor. The closed circuit has a high pressure side and a low pressure side which is often referred to as the vacuum side. It is preferable in some applications to use a charge pump to provide pressurized fluid to the low pressure side to improve the performance of the unit. Such charge pumps are connected to the hydraulic circuit through porting, hoses or similar means. The invention described herein provides a device for providing pressurized charge fluid to the low pressure side of the hydraulic circuit.

A better understanding of the objects, advantages, features, properties and relationships of the invention will be obtained from the following detailed description and accompanying drawings which set forth illustrative embodiments and are indicative of the various ways in which the principles of the invention may be employed.

DETAILED DESCRIPTION OF THE DRAWINGS

Figure 1:
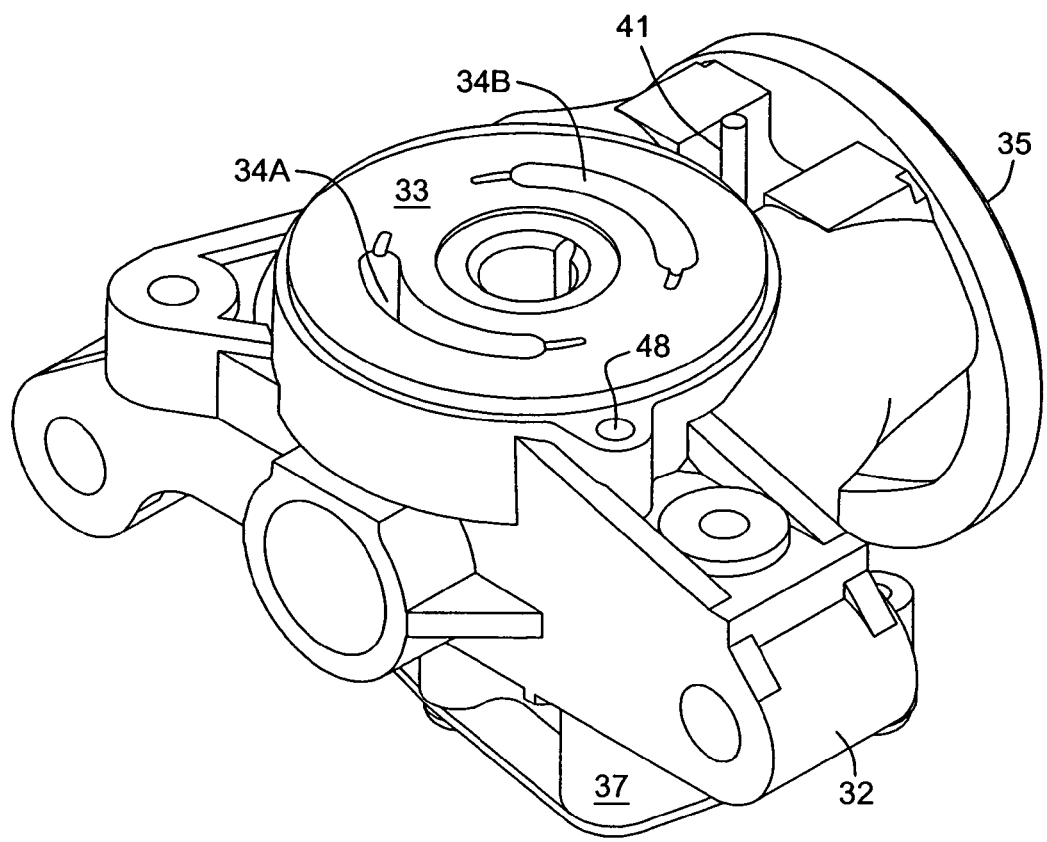
FIG. 1 is a perspective view of a center section for use in a hydrostatic transmission or integrated hydrostatic transaxle.
Figure 2:
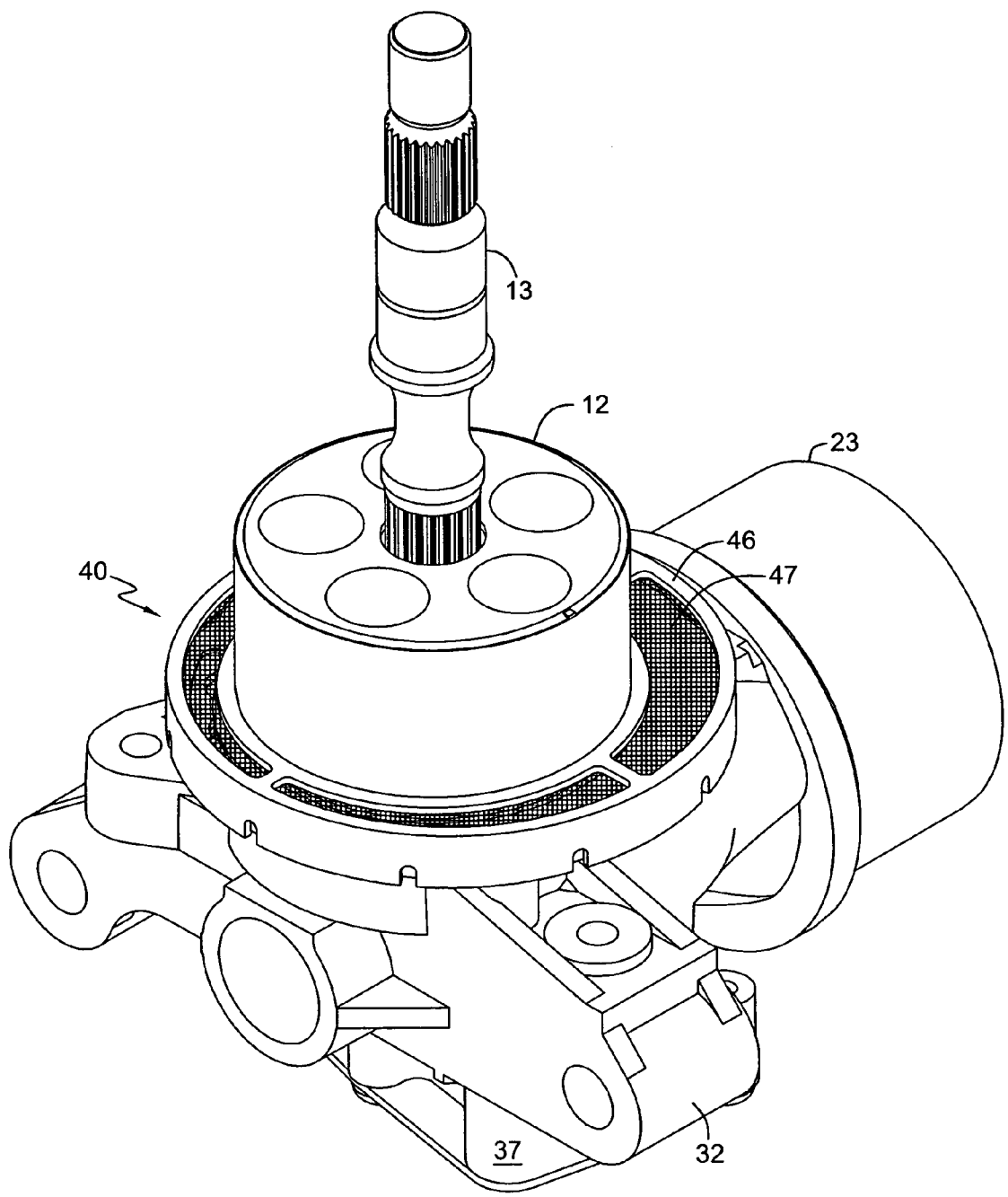
FIG. 2 is a perspective view of the center section shown in FIG. 1 including a pump cylinder block and pump input shaft mounted thereon and a gerotor charge pump mounted adjacent to the cylinder block, with certain elements removed for clarity.

FIGS. 1 to 23 show several versions of a first embodiment of this invention, namely a pump or transaxle incorporating a gerotor-style charge pump. FIGS. 1 to 14 show such a charge pump in connection with a center section for use in a HST or IHT, while FIGS. 15 to 23 show this charge pump in connection with a stand-alone pump unit. For consistency, similar features will be given similar reference numerals. The term center section is used herein to mean any structure comprising a hydraulic circuit and at least a running surface for the rotating kit of a hydraulic pump.

Figure 3:
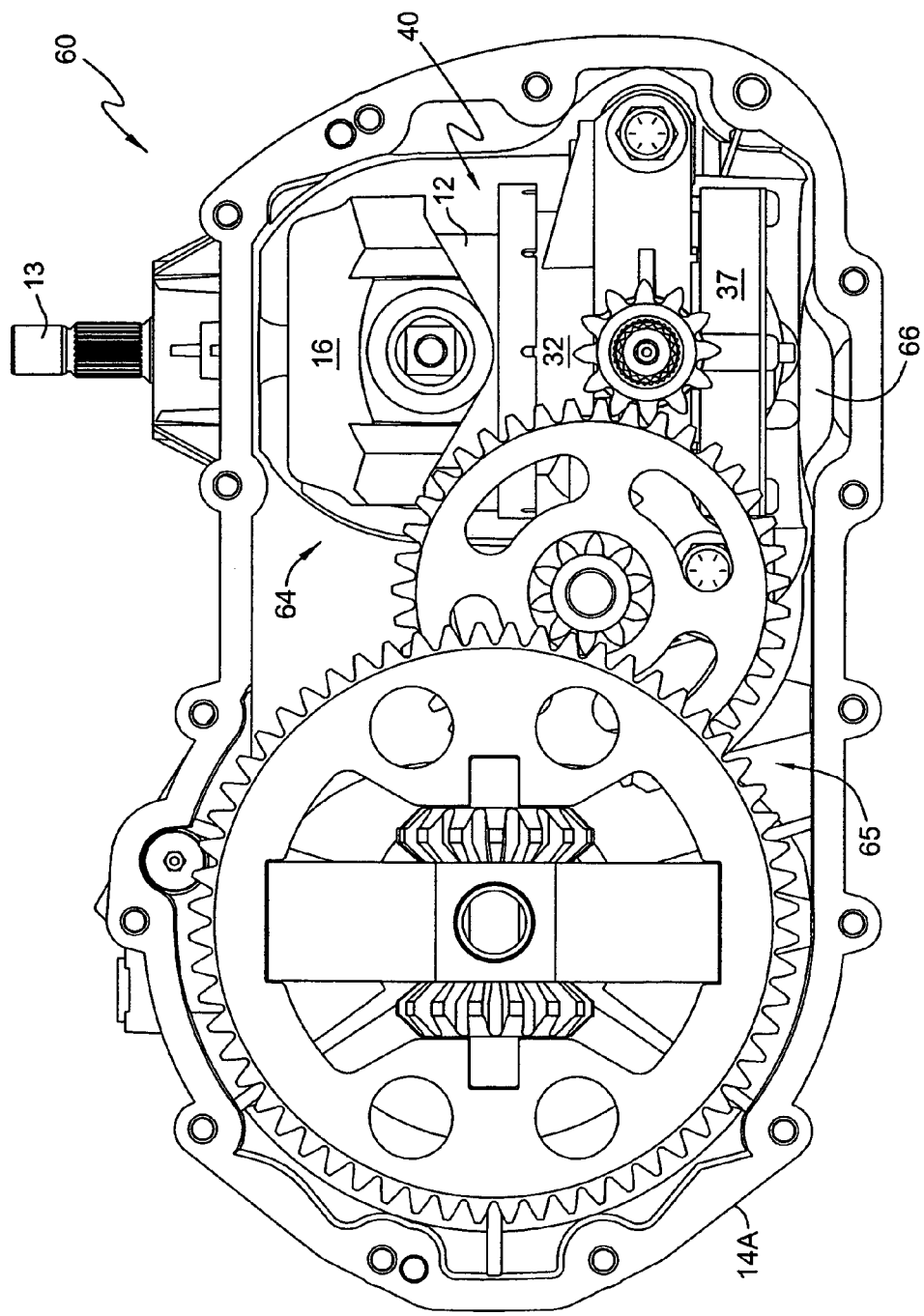
FIG. 3 is a side view of an integrated hydrostatic transaxle incorporating the center section assembly of FIG. 2, with one housing element removed to show the internal structure.
Figure 4:
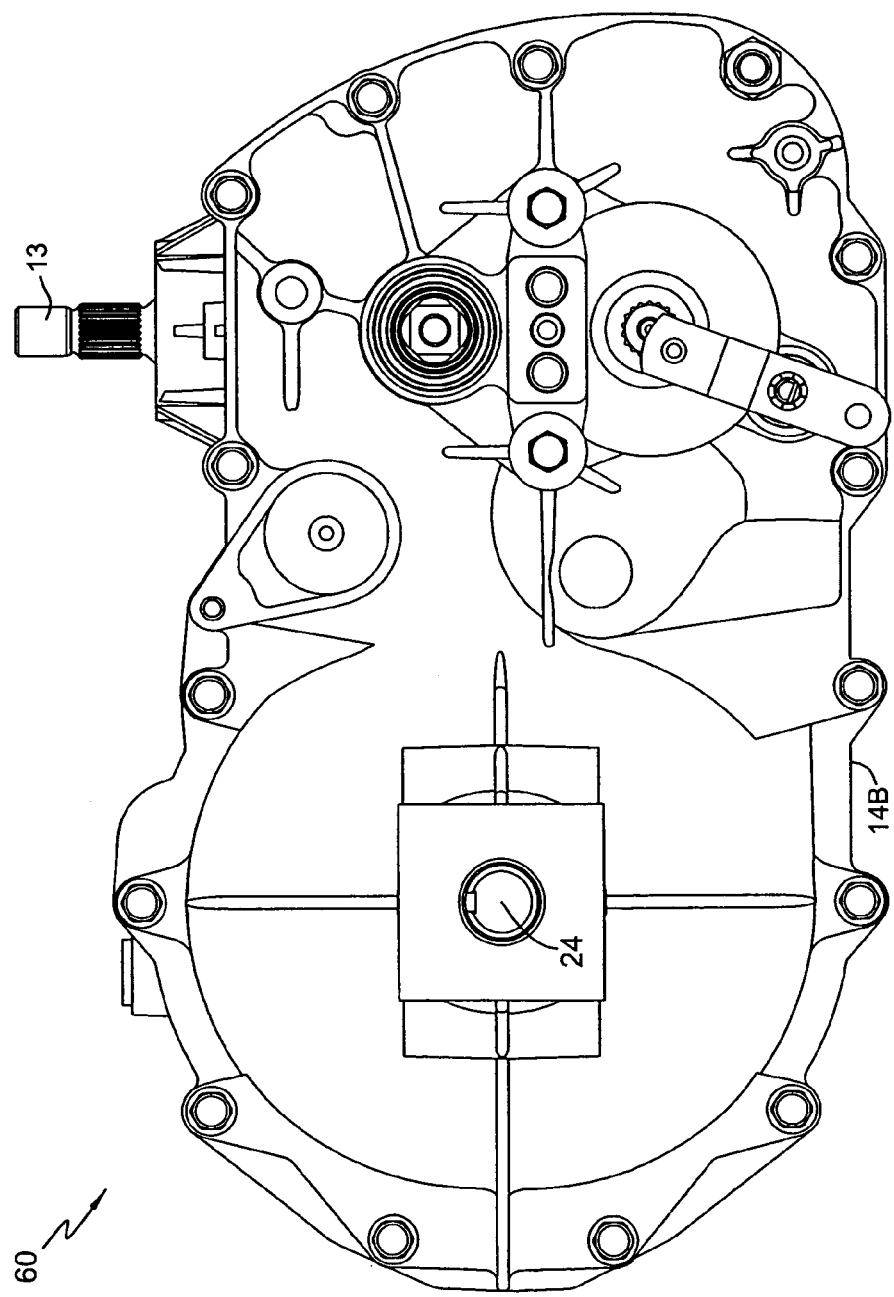
FIG. 4 is a side external view of the transaxle of FIG. 3.
Figure 5:
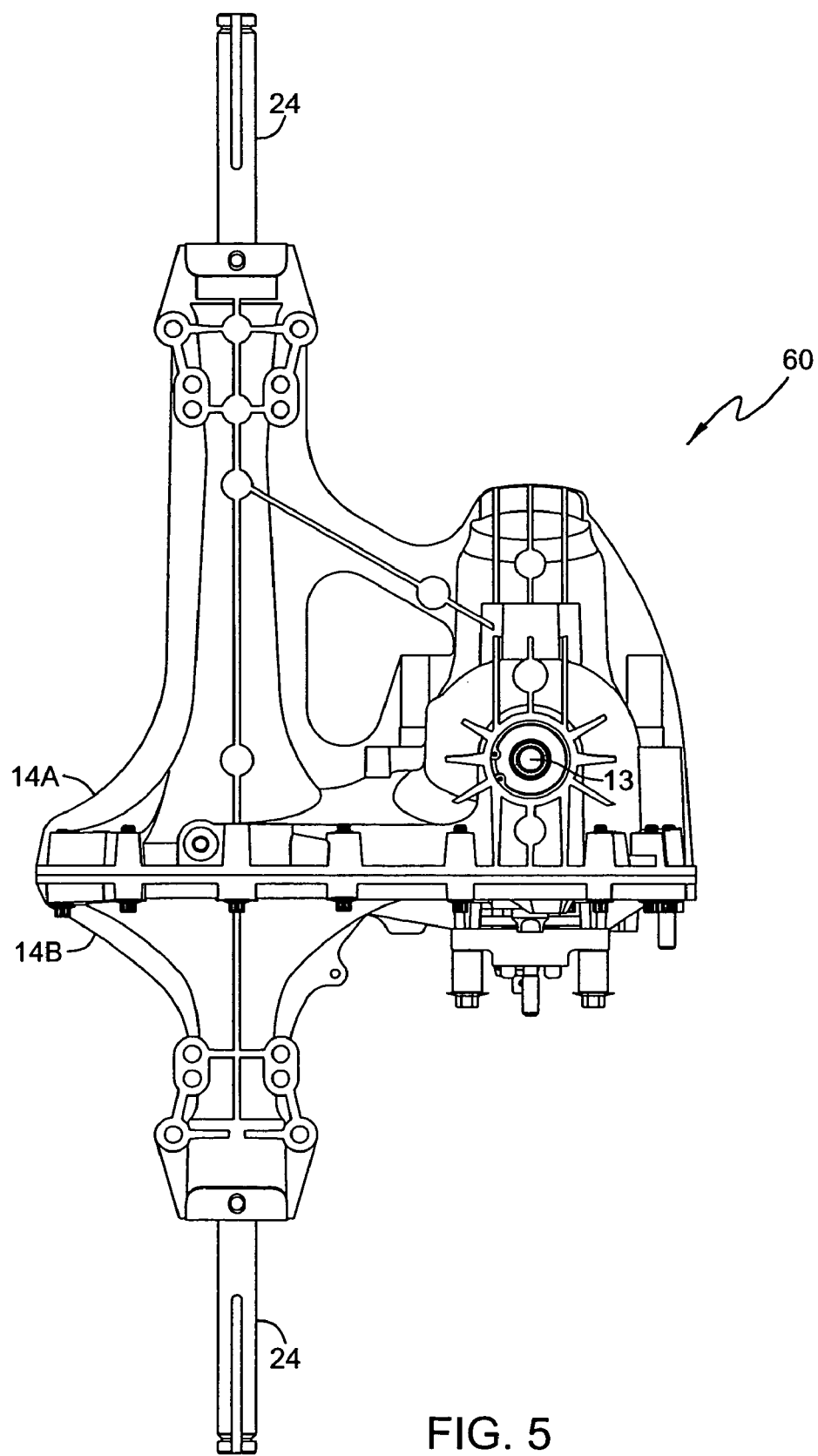
FIG. 5 is a top plan view of the transaxle of FIG. 3.

An exemplary center section 32 is shown in FIG. 1 and an exemplary transaxle 60 is shown in FIGS. 3, 4 and 5. Most of the elements of the transaxle 60, including center section 32 are depicted in the form similar to that shown in U.S. Pat. No. 6,253,637, as a representative design. It will be understood, however that many different shapes and configurations of transaxles and center sections are known and could be used with this invention. It will also be understood that some elements of the hydrostatic transmission that are not essential to the invention (e.g., the pump and motor pistons and the motor shaft) are not depicted in certain figures for reasons of clarity.

Hydrostatic transmission 64 is mounted in a housing consisting of two housing components 14A and 14B joined along a split line perpendicular to the output axles 24, and which form an internal sump 66. Hydrostatic transmission 64 comprises pump cylinder block 12 and motor cylinder block 23 mounted on center section 32 and connected via hydraulic porting 30, as seen most clearly in FIG. 8. A swash plate 16 controls the output of hydrostatic transmission 64. Gear train 65 connects hydrostatic transmission 64 and output axles 24.

Figure 6:
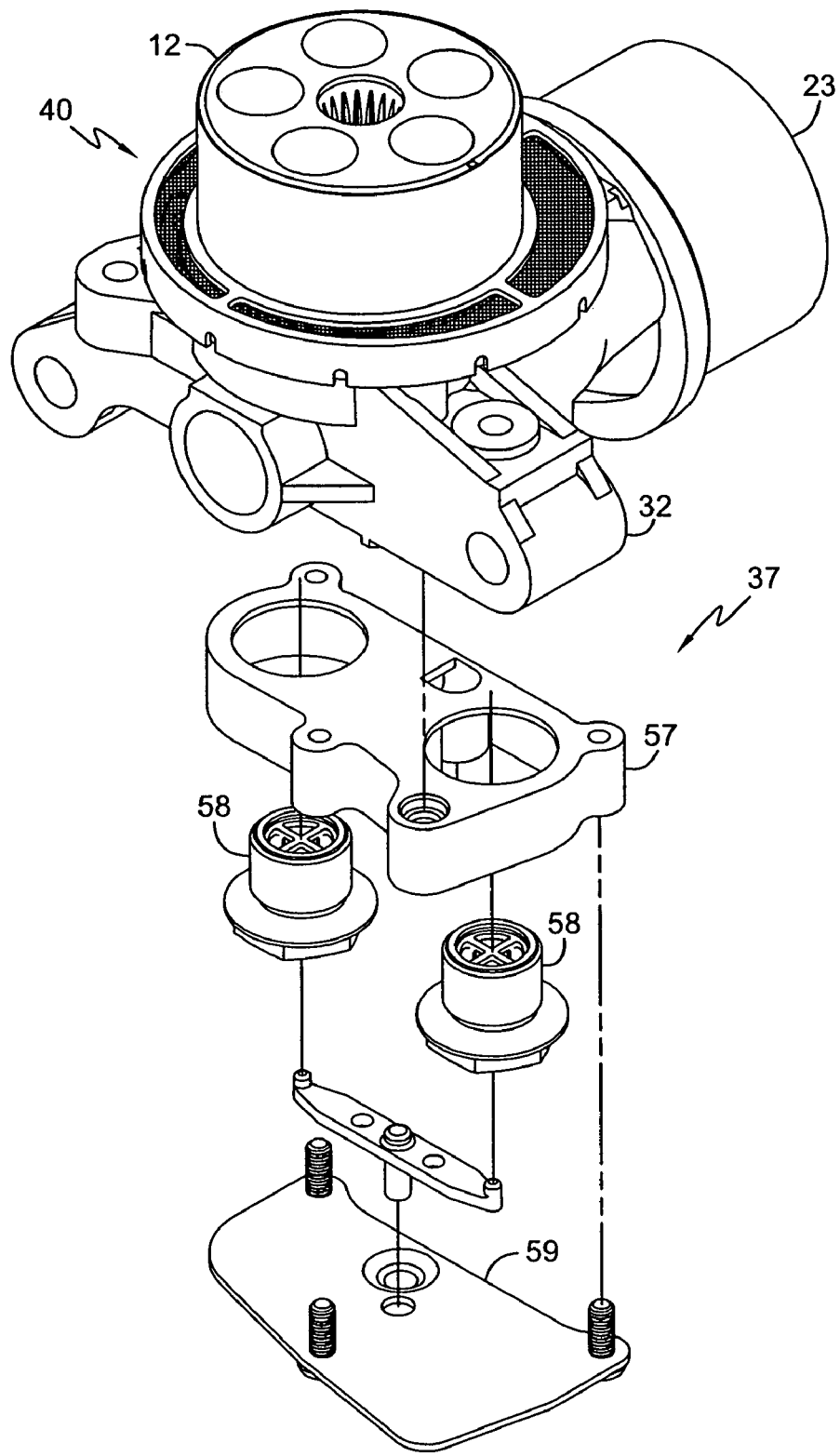
FIG. 6 is a partially exploded view of the center section assembly of FIG. 2.
Figure 7:
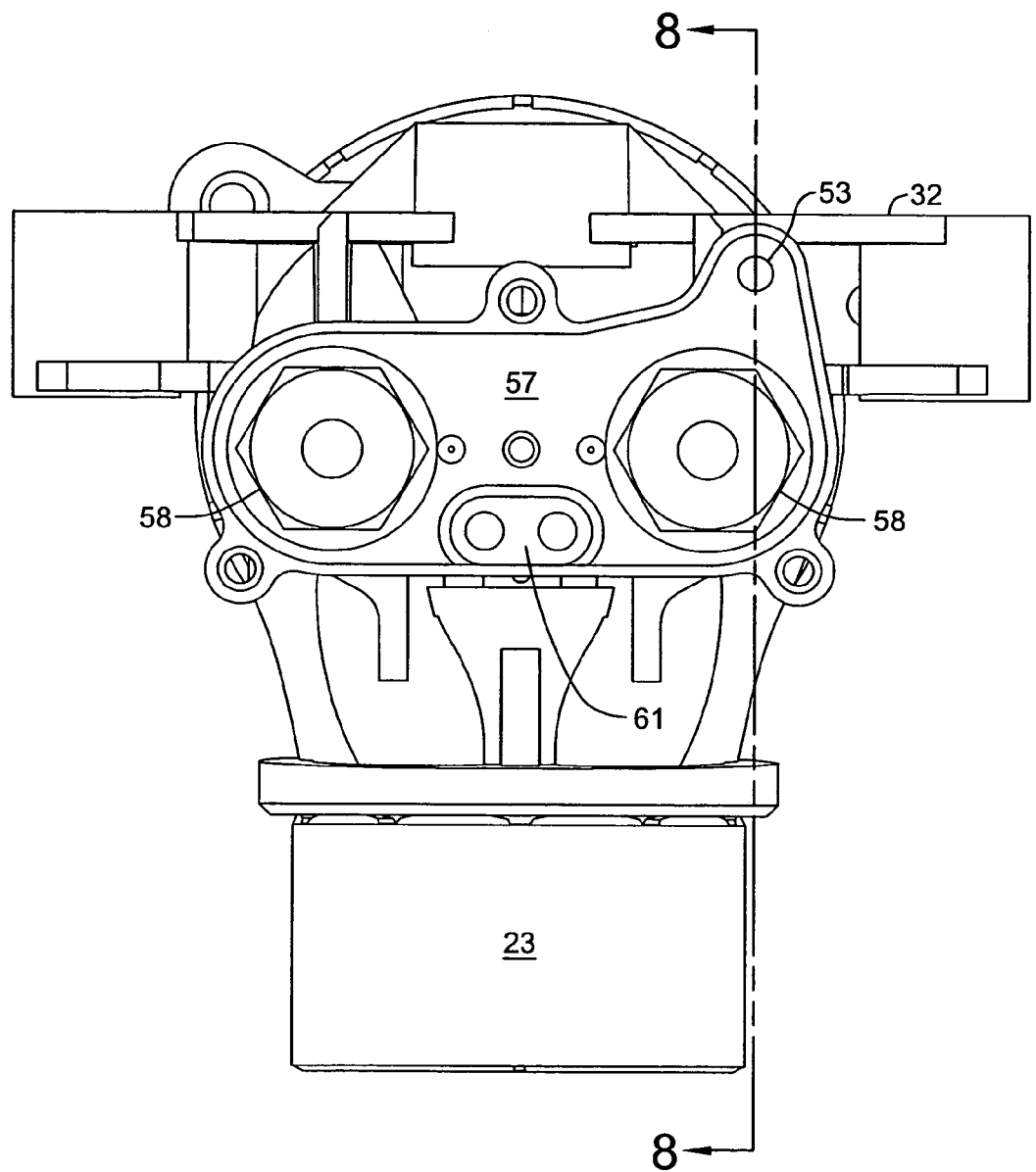
FIG. 7 is a bottom plan view of the center section of FIG. 2 with the charge gallery cover removed.
Figure 8:
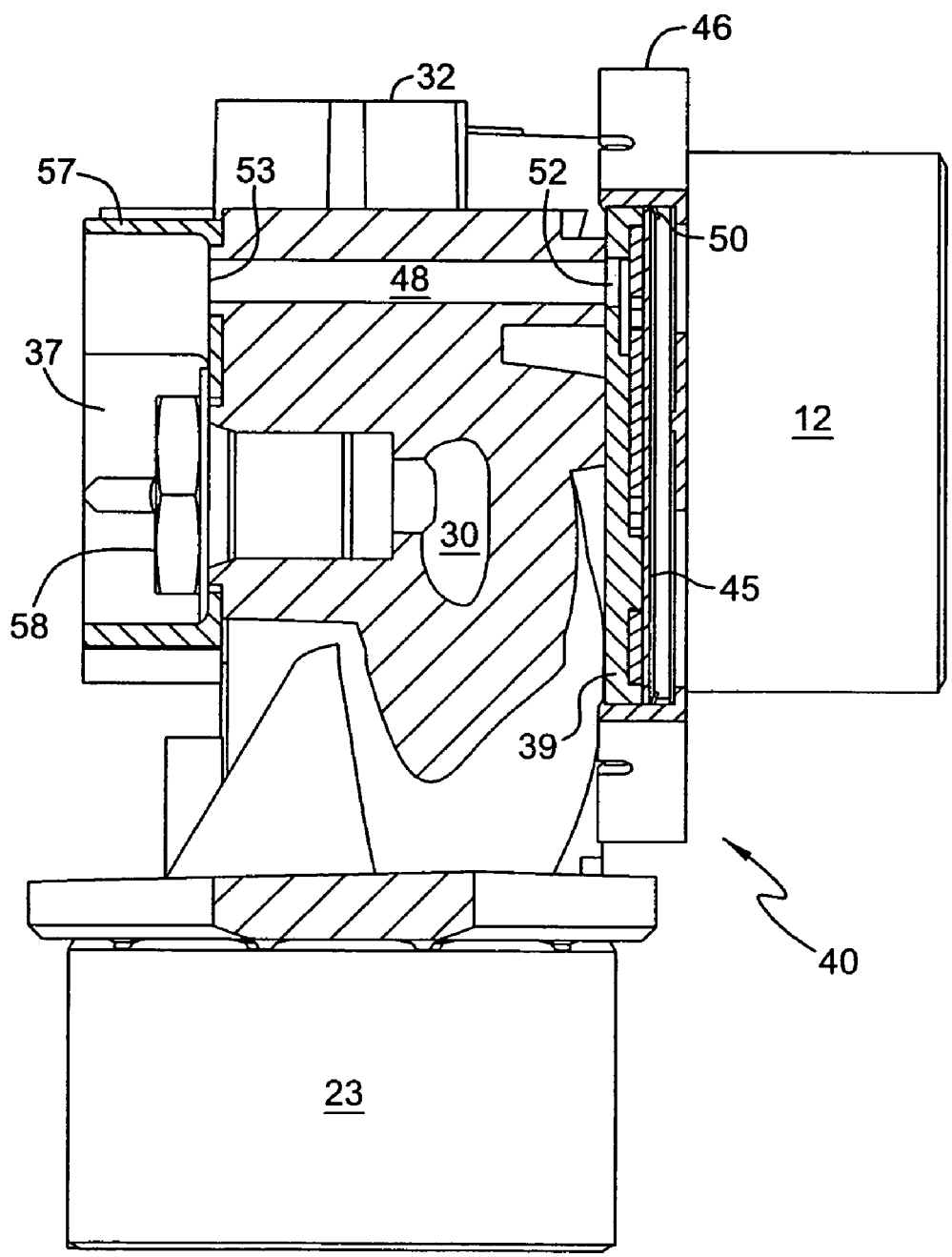
FIG. 8 is a cross-sectional view of the center section and motor assembly of FIG. 7 along the lines 8—8.
Figure 9:
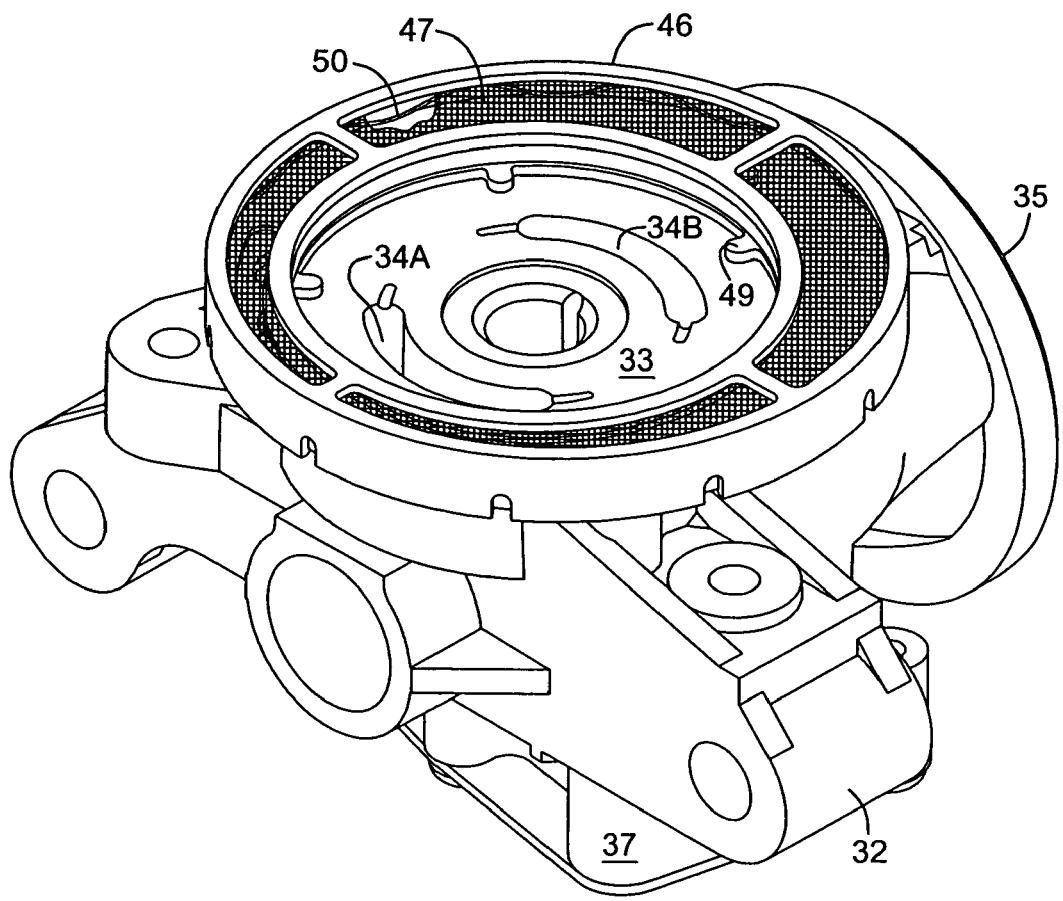
FIG. 9 is a perspective view of the center section of FIG. 1 with the gerotor charge pump mounted thereon.
Figure 10:
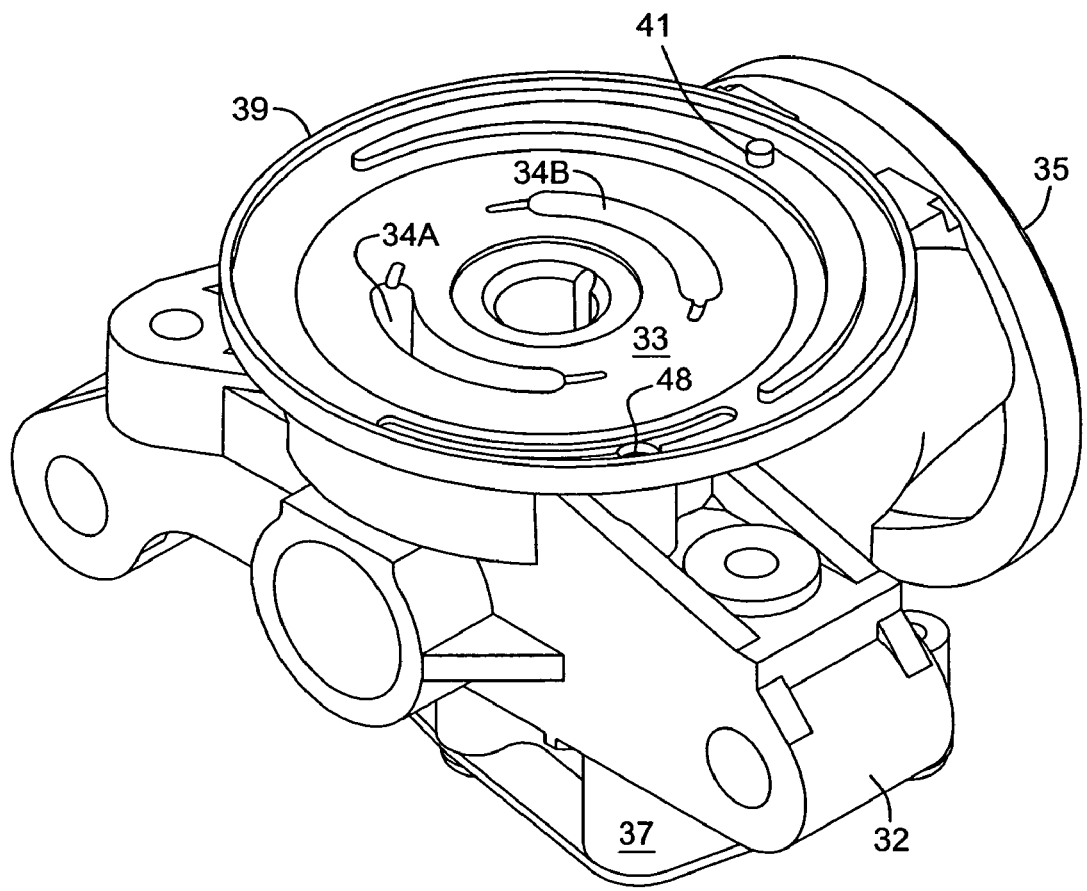
FIG. 10 is a perspective view of the center section of FIG. 1 with a portion of the gerotor charge pump mounted thereon.
Figure 11:
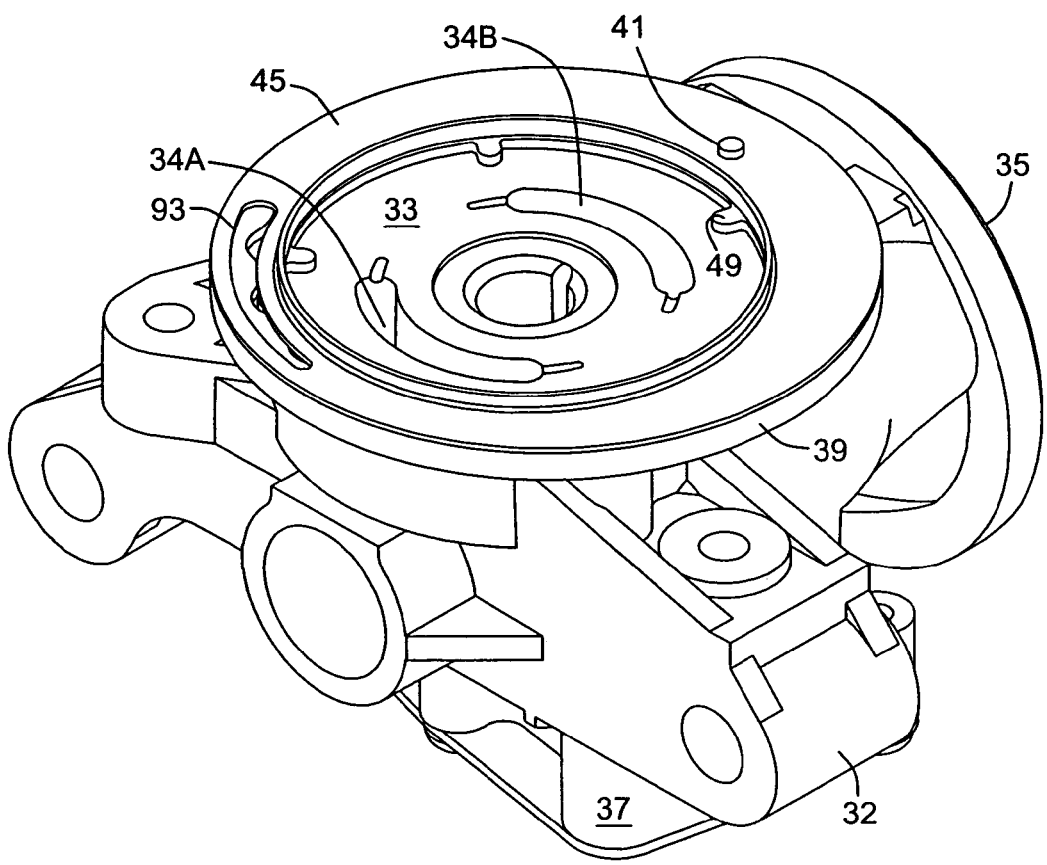
FIG. 11 is a perspective view of the center section of FIG. 1 with a portion of the gerotor charge pump mounted thereon.

Center section 32, which would be mounted in sump 66, has a pump running surface 33 with kidneys 34A and 34B formed thereon to access hydraulic circuit 30 and a motor running surface 35 also having similar kidneys (not shown) formed thereon, again to access hydraulic circuit 30. Center section 32 has a charge gallery 37 mounted thereon to provide fluid to check plugs 58, which are used to provide make up fluid to the low pressure (or vacuum) side of hydraulic circuit 30. A charge port 48 is formed in center section 32 with a first opening 52 adjacent to pump running surface 33 and a second opening 53 into gallery 37. As shown in FIG. 6, gallery 37 comprises a gallery housing 57 secured to center section 32 by means of check plugs 58 and closed by cover 59. Other designs to form a charge gallery could readily be used with this invention. FIG. 7 shows a bottom view of this assembly with cover 59 removed.

In FIGS. 2, 3, 6, and 8, one can see pump cylinder block 12 mounted on center section 32 and driven by input shaft 13. A gerotor charge pump 40 is mounted on center section 32 adjacent to cylinder block 12. FIGS. 9–12 show gerotor charge pump 40 in differing states of assembly in order to clearly depict the interaction of the various components.

Gerotor charge pump 40 comprises a rotor plate 39 mounted to center section 32. Filter housing 46 including mesh filter 47 snaps onto or interlocks with lower gerotor housing or rotor plate 39, which then captures the remaining elements, described further below.

An outer rotor ring 42 is mounted in rotor plate 39 about the circumference thereof, and outer rotor ring 42 and inner rotor ring 44 are slidingly mounted within rotor plate or housing 39. An inner rotor ring 44 is also mounted in rotor plate 39 in a manner so that it engages both a portion of outer rotor ring 42 and rib 43 formed in rotor plate 39 so that rotation of inner rotor ring 44 with respect to outer rotor ring 42 creates a pumping action. Upper rotor plate 45 is positioned on top of rotor plate 39 and cooperates with rotor plate 39 to constrain inner gerotor ring 44 and outer gerotor ring 42. Wave spring 50 is compressed between upper rotor plate 45 and filter housing 46, keeping upper rotor plate 45 in position against the pressure created by gerotor charge pump 40 as it is driven by pump cylinder block 12. Upper rotor plate 45 may also be kept in a position by a feature formed in filter housing 46, by a spacer positioned between upper rotor plate 45 and filter housing 46, or other known means. Pin 41 is mounted to center section 32 to prevent rotation of the rotor plates 39 and 45.

For relief of excessive pressure in charge gallery 37 a charge relief 61 is provided. However, an alternative charge relief finction may be provided by the components of this embodiment. The compressive force of wave spring 50 may be chosen to allow upper rotor plate 45 to move when the pressure created by charge pump 40 reaches a predetermined level, thus functioning as a charge relief.

Figure 12:
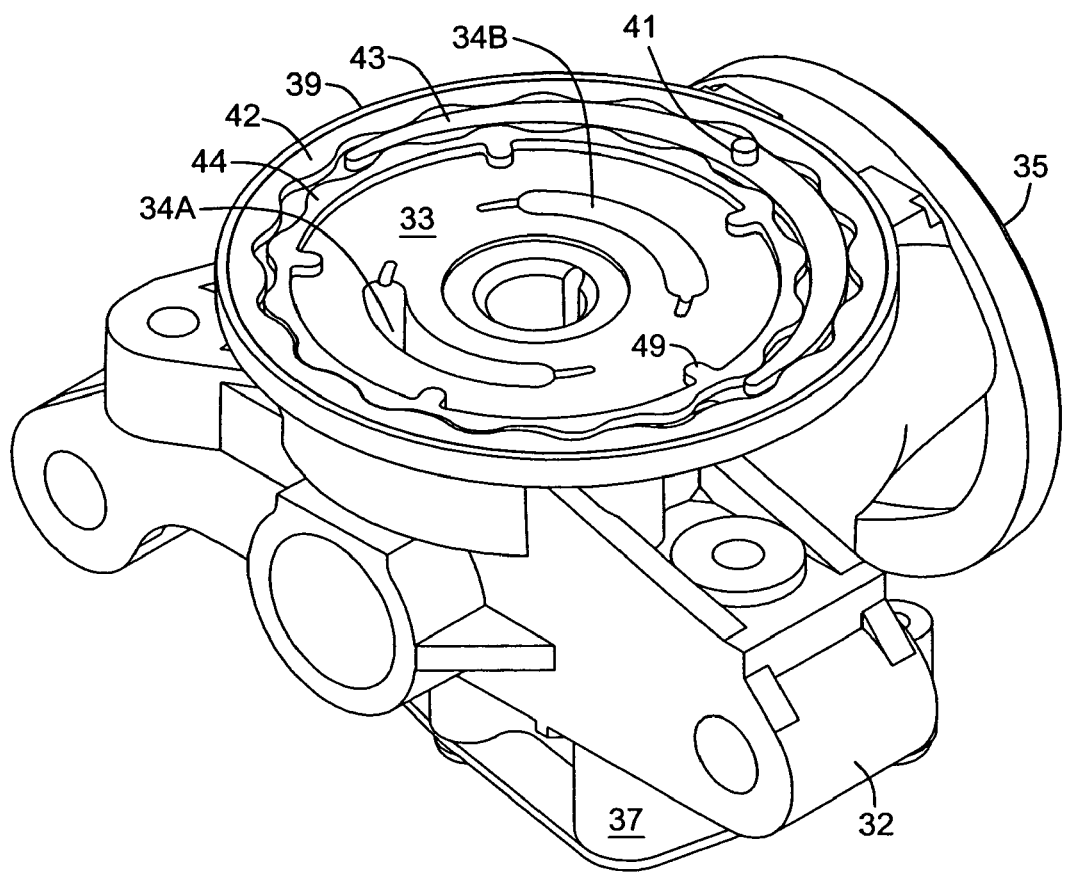
FIG. 12 is a perspective view of the center section of FIG. 1, with a portion of the gerotor charge pump mounted thereon.
Figure 13:
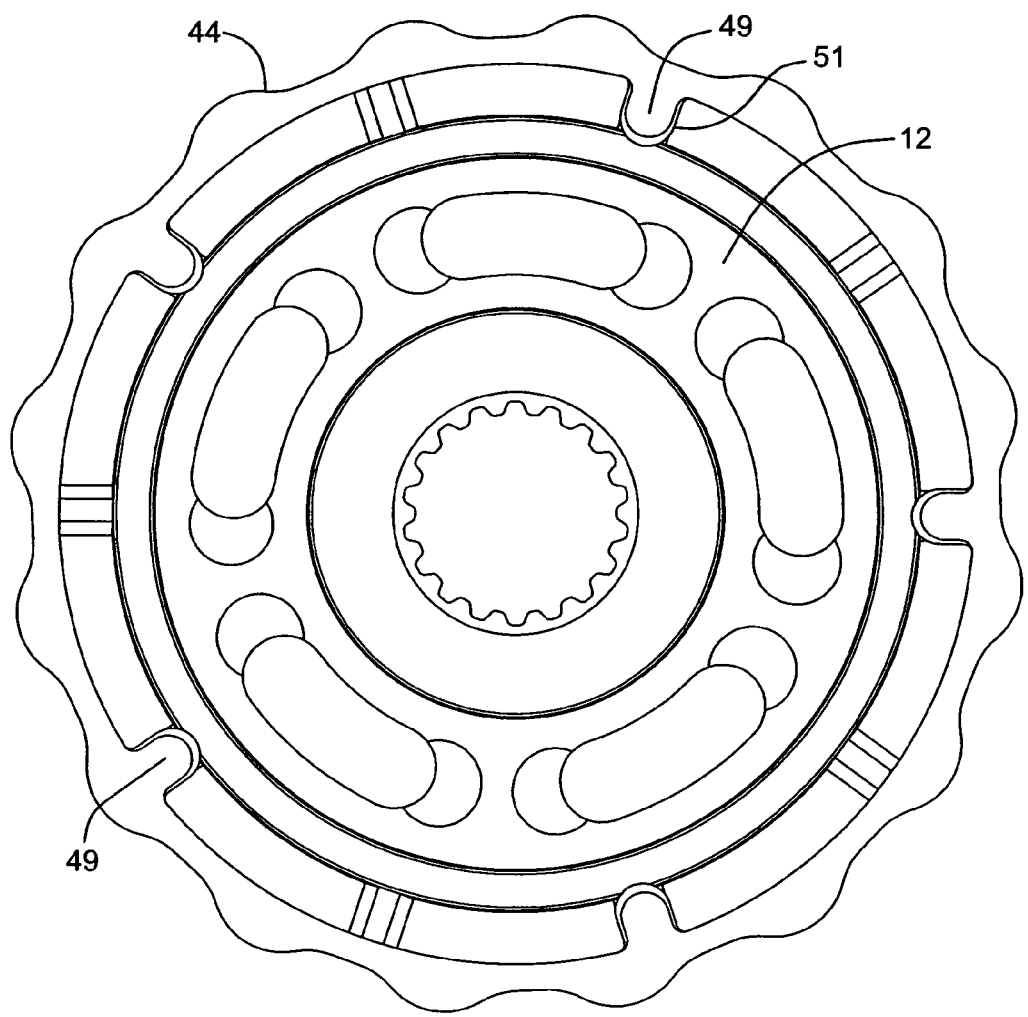
FIG. 13 is a bottom view of the cylinder block and portions of the gerotor charge pump of this embodiment.

As shown in FIGS. 12 and 13, for example, inner rotor ring 44 has a plurality of projections 49 formed thereon, which engage corresponding notches 51 on cylinder block 12 so that rotation of cylinder block 12 also drives inner rotor ring 44 and thus drives gerotor charge pump 40. The rotary action of gerotor charge pump 40, and in particular the action of inner rotor ring 44 against outer ring 42, pulls fluid through mesh filter 47 and through opening 93 formed in upper rotor housing 45. The fluid pressurized by charge pump 40 is then pushed through charge port 48 to provide pressurized fluid to gallery 37.

Figure 14:
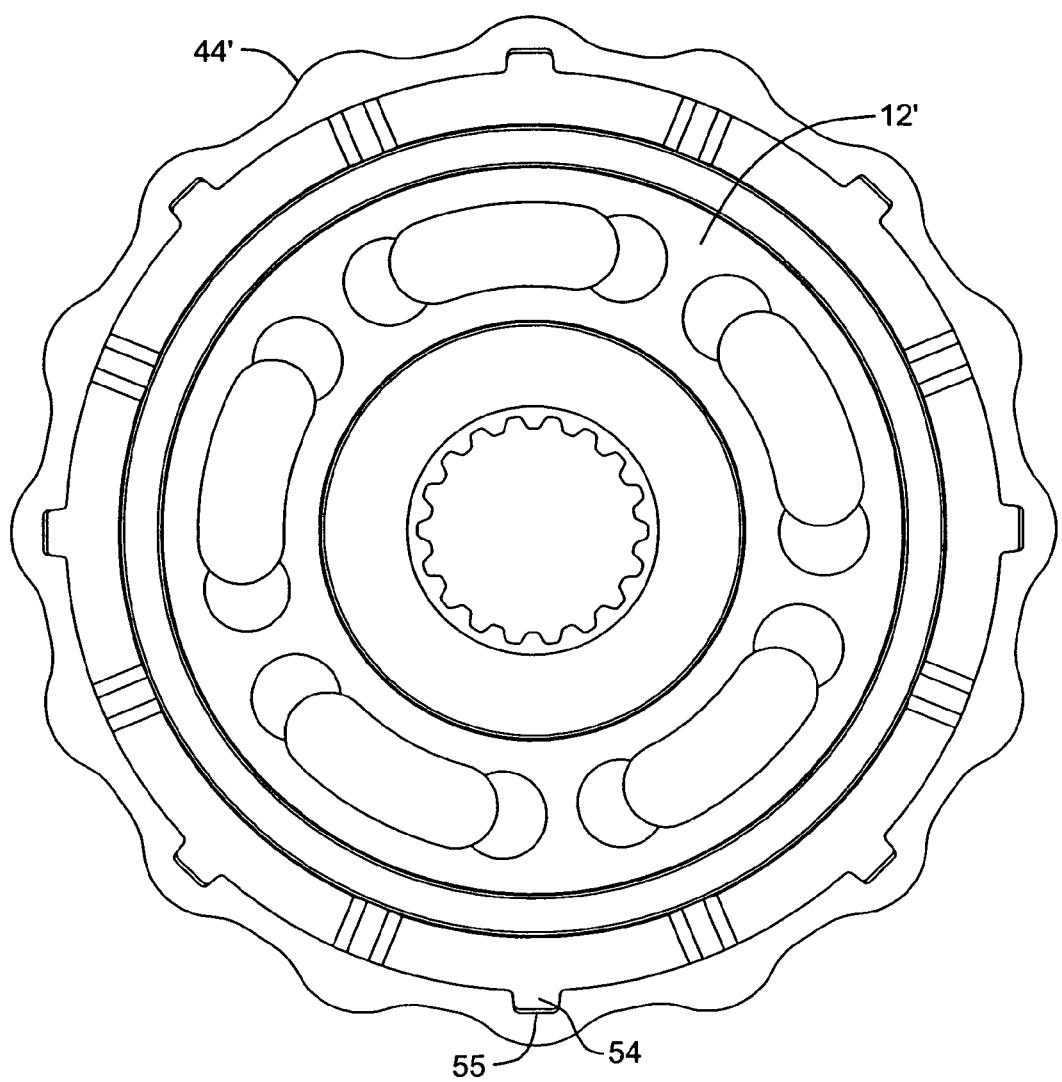
FIG. 14 is a bottom view of a different embodiment of the cylinder block and gerotor charge pump, similar to that shown in FIG. 13.

A variation on this design is shown in FIG. 14, which shows cylinder block 12' having a plurality of engagement projections or ribs 54 extending outwardly therefrom, and rotor 44' has a plurality of matching openings 55 to receive ribs 54 to thereby drive rotor 44'.

With regard to the pump unit 110 shown in FIGS. 15 to 23, a pump cylinder block 12 is mounted in a sump 120 created by housing 114 mounted to an end cap. It will be understood that these figures depict a simplified view of such a pump unit 110 and that not all elements of the pump are shown for purposes of clarity. It will also be understood that other alternative pump designs could readily be used with the present invention.

In this design, a plurality of pump pistons 119 are mounted in cylinder block 12 and interact against movable swash plate 116 to push hydraulic fluid through system porting 124. In this embodiment, swash plate 116 is controlled by means of a trunnion (not shown) extending out of the side of housing 114; it will be understood that other means of controlling swash plate 116, and thus the output of pump unit 110 are known and could be used with this invention. Input shaft 113 extends through housing 114 to drivingly engage cylinder block 112.

Figure 16:
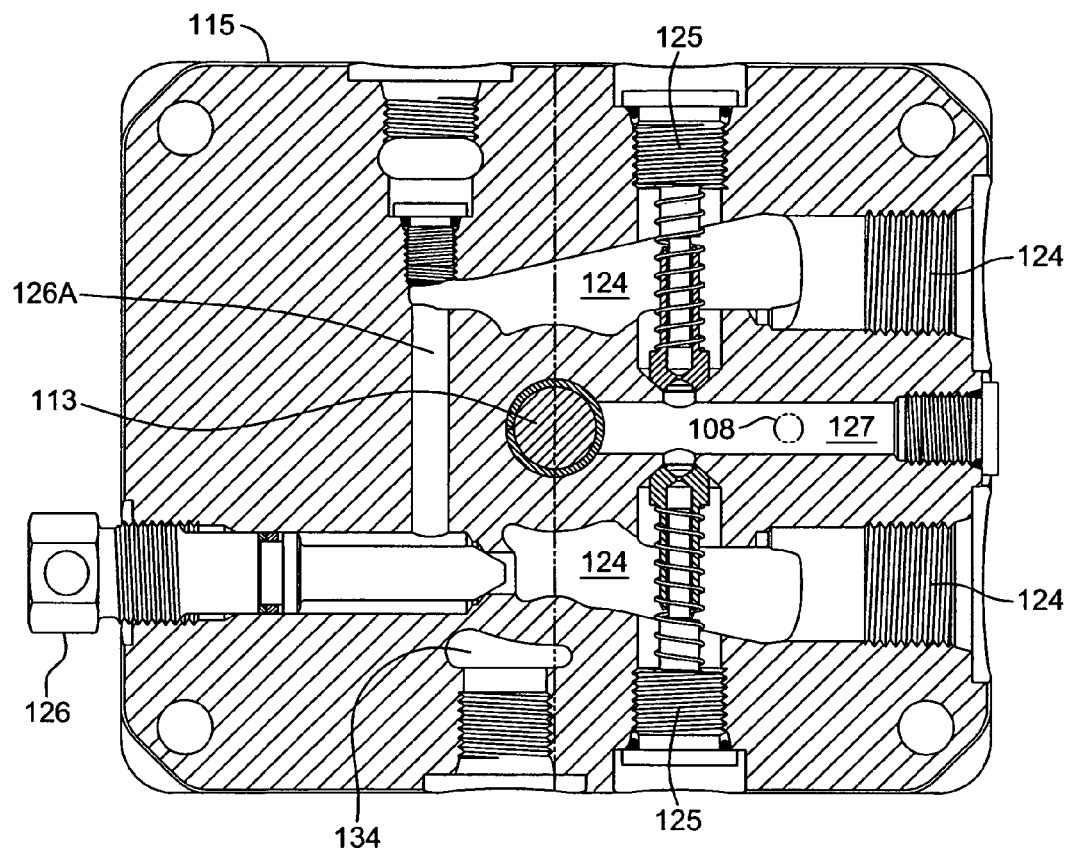
FIG. 16 is a cross-sectional plan view of the end cap of the pump assembly of FIG. 15, along the lines 16—16.
Figure 17:
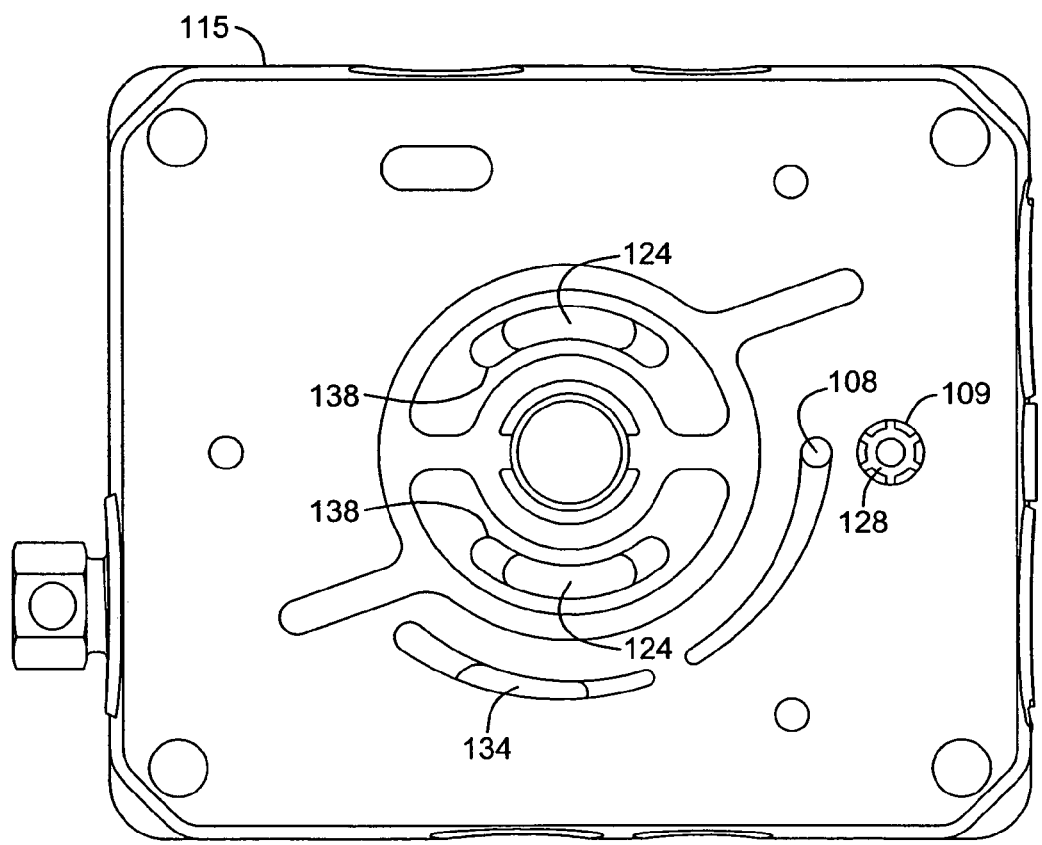
FIG. 17 is a top plan view of the end cap of the pump assembly shown in FIG. 15.

As shown most clearly in the cross-sectional view of FIG. 16, end cap 115 comprises a pair of system ports 124 which can be connected to a hydraulic motor (not shown) or other apparatus, a pair of check plugs 125, and a bypass valve 126. Cross-passage 126A connects bypass valve 126 and both system ports 124.

A charge passage 127 is also bored into end cap 115. A charge port 108 connects charge pump 121 to charge passage 127, and pressure relief valve 109 permits excessive pressure to escape to sump 120. A star shaped retaining ring 128 may be pressed into charge relief 109 to retain the components of the charge relief and to permit oil to escape around its periphery.

Figure 18:
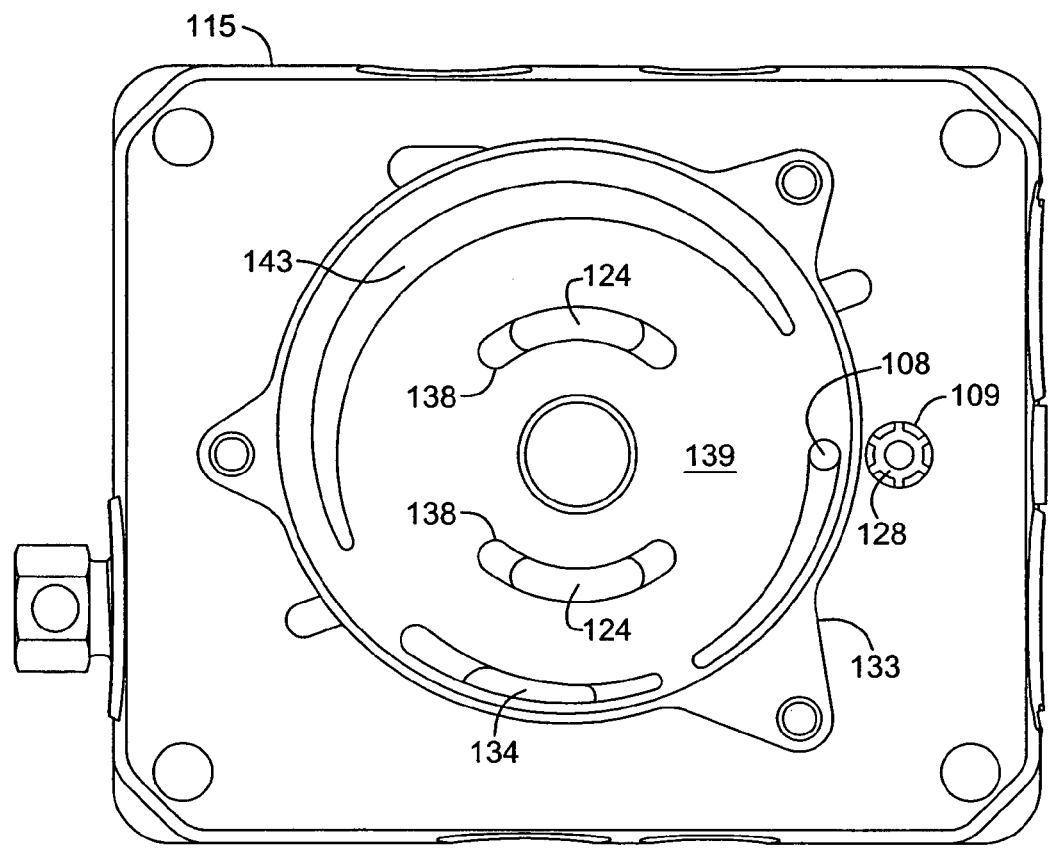
FIG. 18 is a top plan view of the end cap shown in FIG. 17, with the first gerotor plate of the charge pump added.
Figure 19:
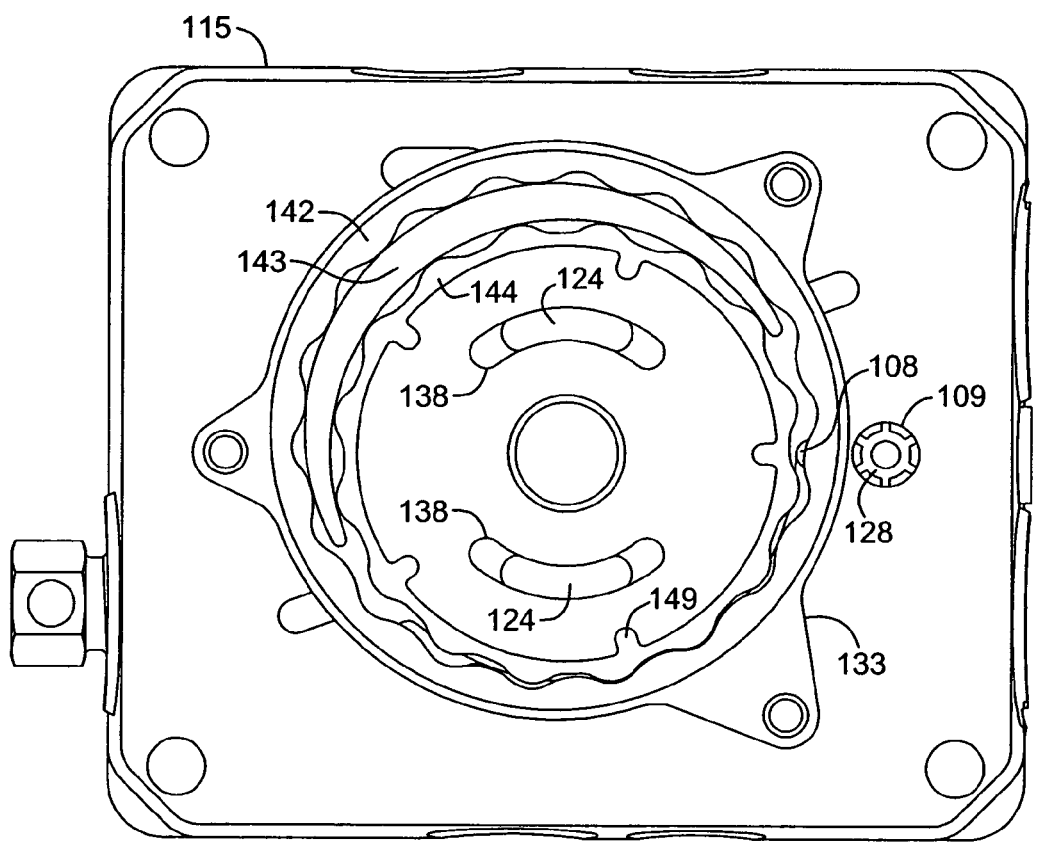
FIG. 19 is another top plan view of the end cap shown in FIG. 17, with additional charge pump elements added.
Figure 20:
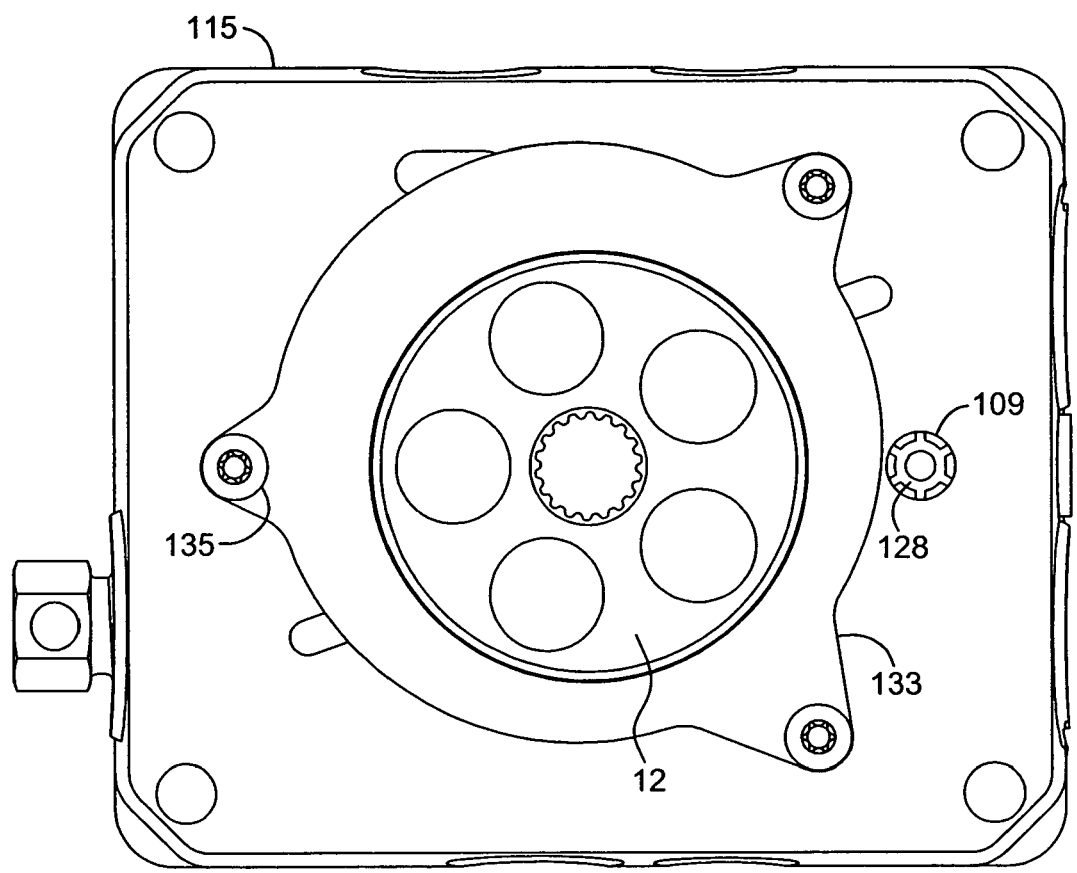
FIG. 20 is another top plan view of the end cap of FIG. 17, with the charge pump and pump cylinder block added.

FIGS. 18 to 20 show end cap 115 with various elements of the charge pump assembly to demonstrate the interaction of these elements. The operation of gerotor charge pump 121 is similar to that of gerotor charge pump 40 described above. Charge pump 121 comprises an upper housing 130 and a lower housing or valve plate 133, and it is secured to end cap 115 by means of a plurality of screws or similar fasteners 135. Lower housing 133 forms a pump running surface 139 and a pair of kidneys 138. Oil is pulled into charge pump 121 through inlet 134, which may be connected to an external sump (not shown). A rib 143 is formed in lower housing 133, and outer rotor ring 142 and inner rotor ring 144 are mounted in a mating relationship as shown most clearly in FIG. 19. A plurality of projections 149 mate the inner rotor ring 144 with cylinder block 12 so that inner rotor ring 144 can rotate with cylinder block 12.

Figure 21:
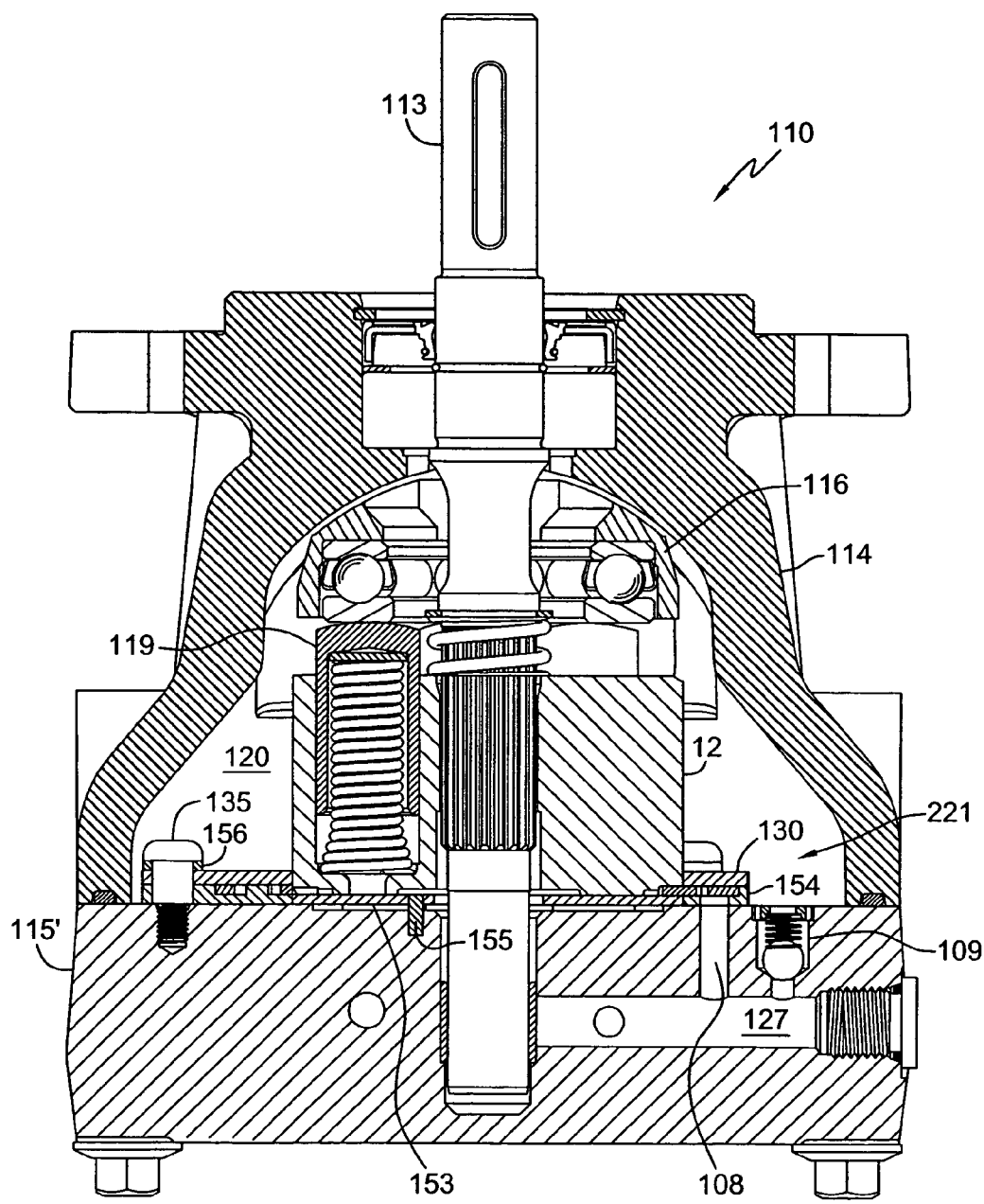
FIG. 21 is a cross-sectional side view of a further embodiment pump assembly including a gerotor charge pump.

A variation on this design is shown in FIG. 21 as gerotor 221, where the lower gerotor housing 133 has been replaced with two separate pieces, namely a separate, generally circular valve plate 153 on which cylinder block 12 runs, and a gerotor plate 154. A dowel pin 155 or similar device would be used to secure valve plate 153 to end cap 115'. An elastomeric material 156 is mounted under the head of screws 135 to prevent deformation of upper housing 130 due to the clamp force of screws 135.

Similar to the first described embodiment, upper housing 130 in cooperation with elastomeric material 156 may be configured to provide a charge relief finction. In this embodiment, the durometer and compression of elastomeric material 156 may be selected to control the pressure at which upper housing 130 compresses elastomeric material 156 to provide charge pressure relief.

Figure 22:
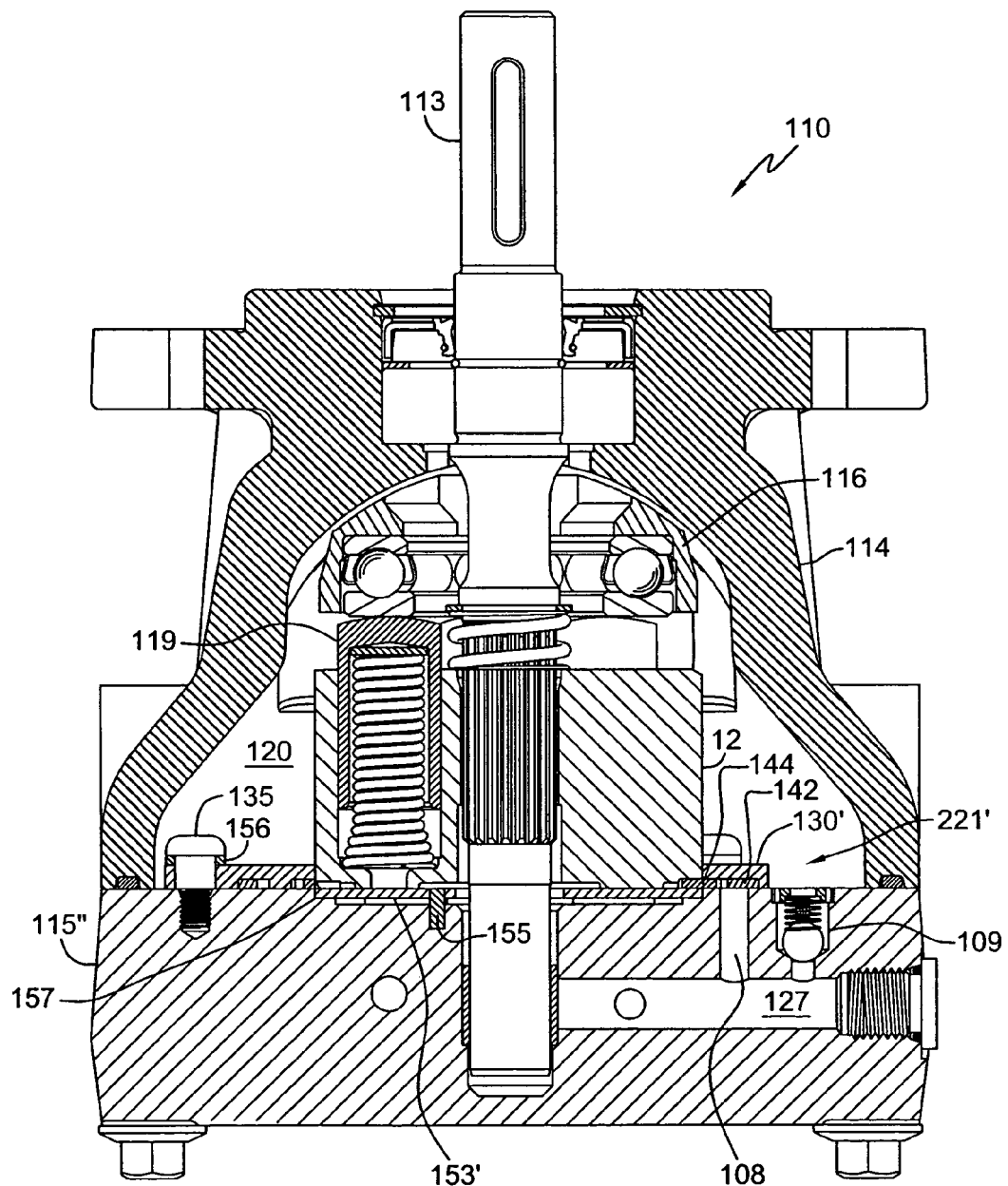
FIG. 22 is a cross-sectional side view of a further embodiment pump assembly including a gerotor charge pump.

Yet another variation on this design is shown in FIG. 22 as gerotor 221', which is similar to FIG. 21 except that valve plate 153' is mounted in recess 157 formed in the top face of end cap 115", and inner rotor and outer rotor 42 run on end cap 115".

Figure 23:
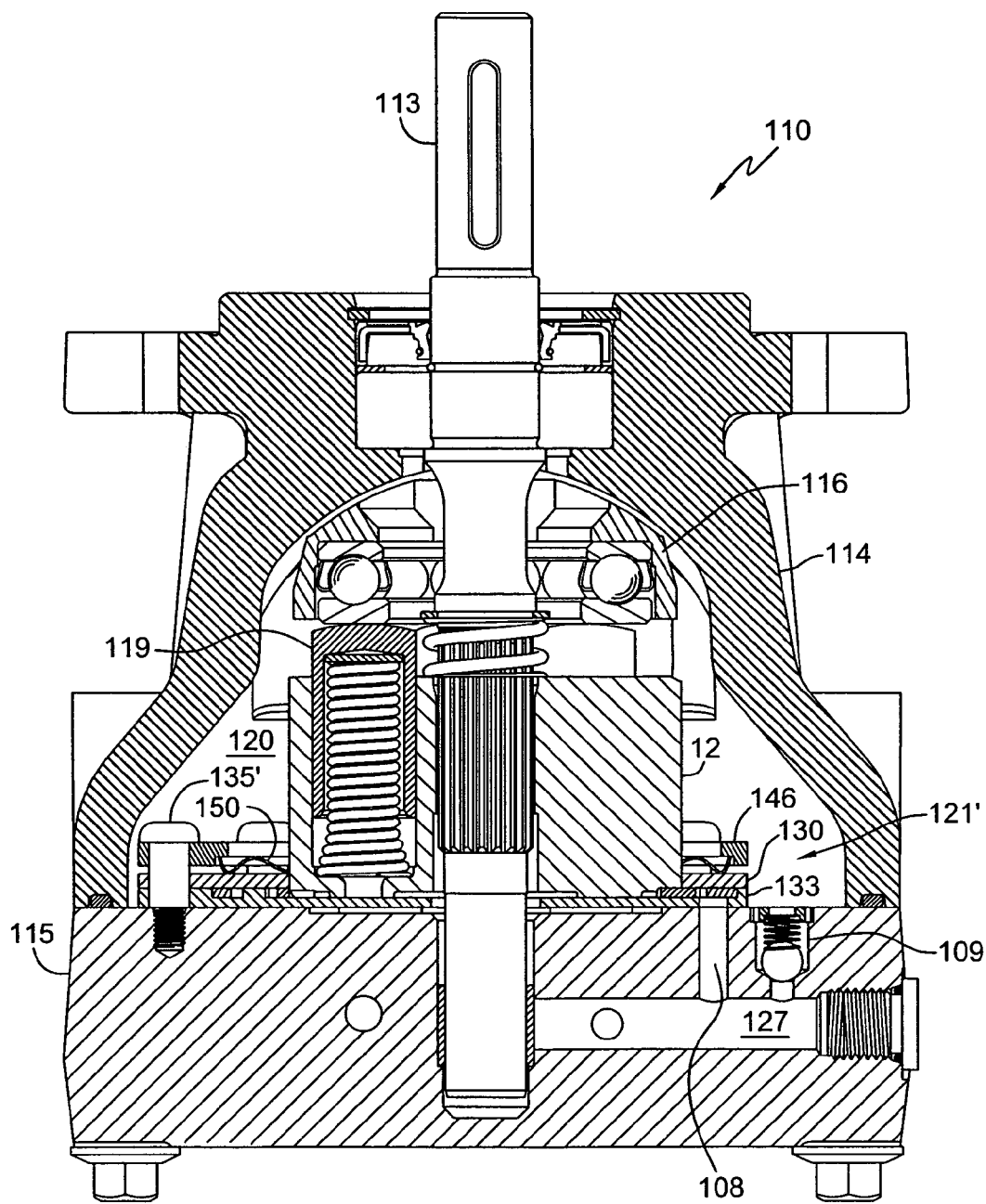
FIG. 23 is a cross-sectional side view of a further embodiment pump assembly including a gerotor charge pump.
Figure 24:
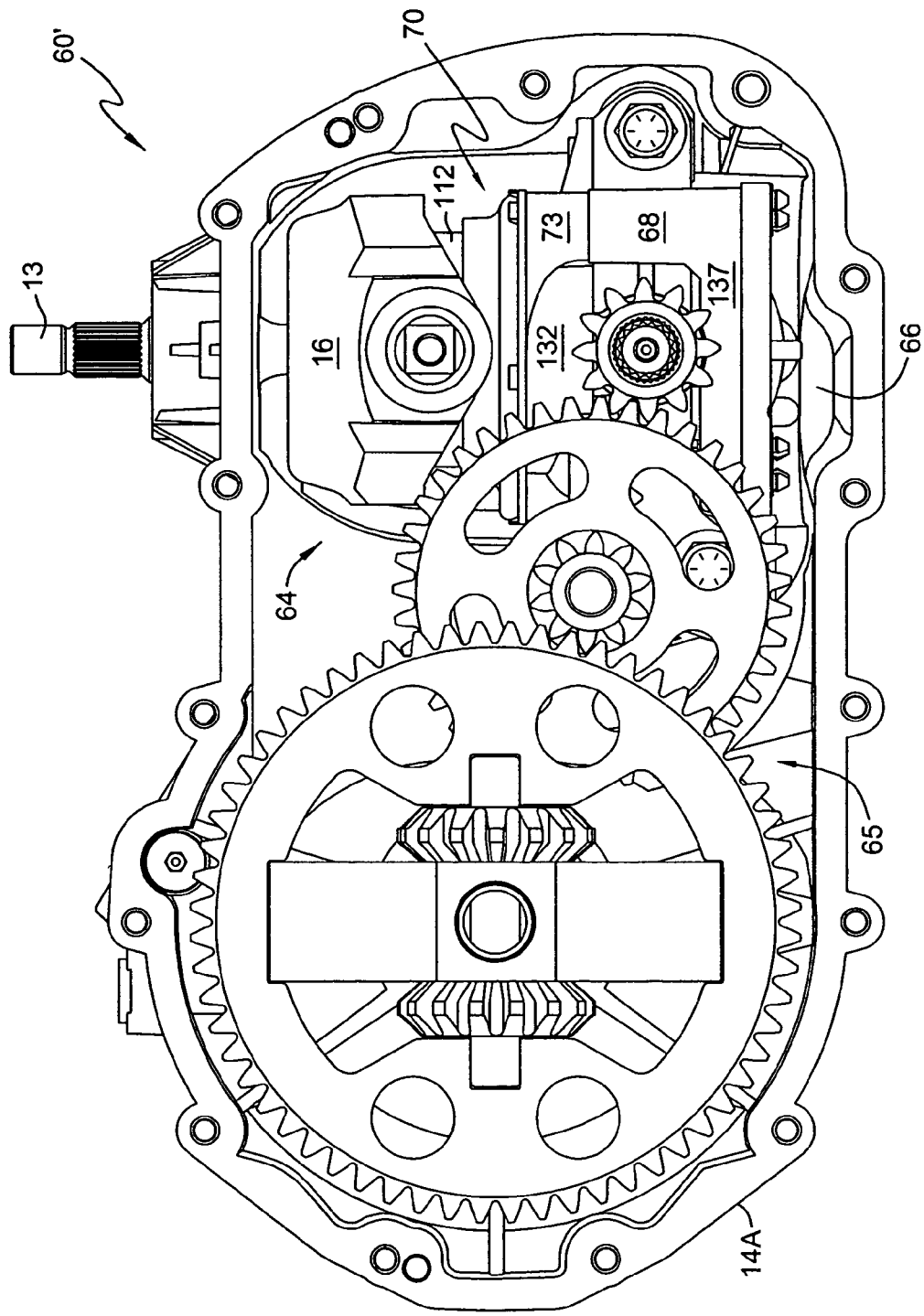
FIG. 24 is a side view of a portion of an integrated hydrostatic transaxle incorporating a further embodiment of the invention.

FIG. 23 shows a further variation on this design, where a retainer 146 is mounted on top of upper housing 130 to retain a wave spring 150 used to maintain pressure around the periphery of charge pump 121'.

Figure 15:
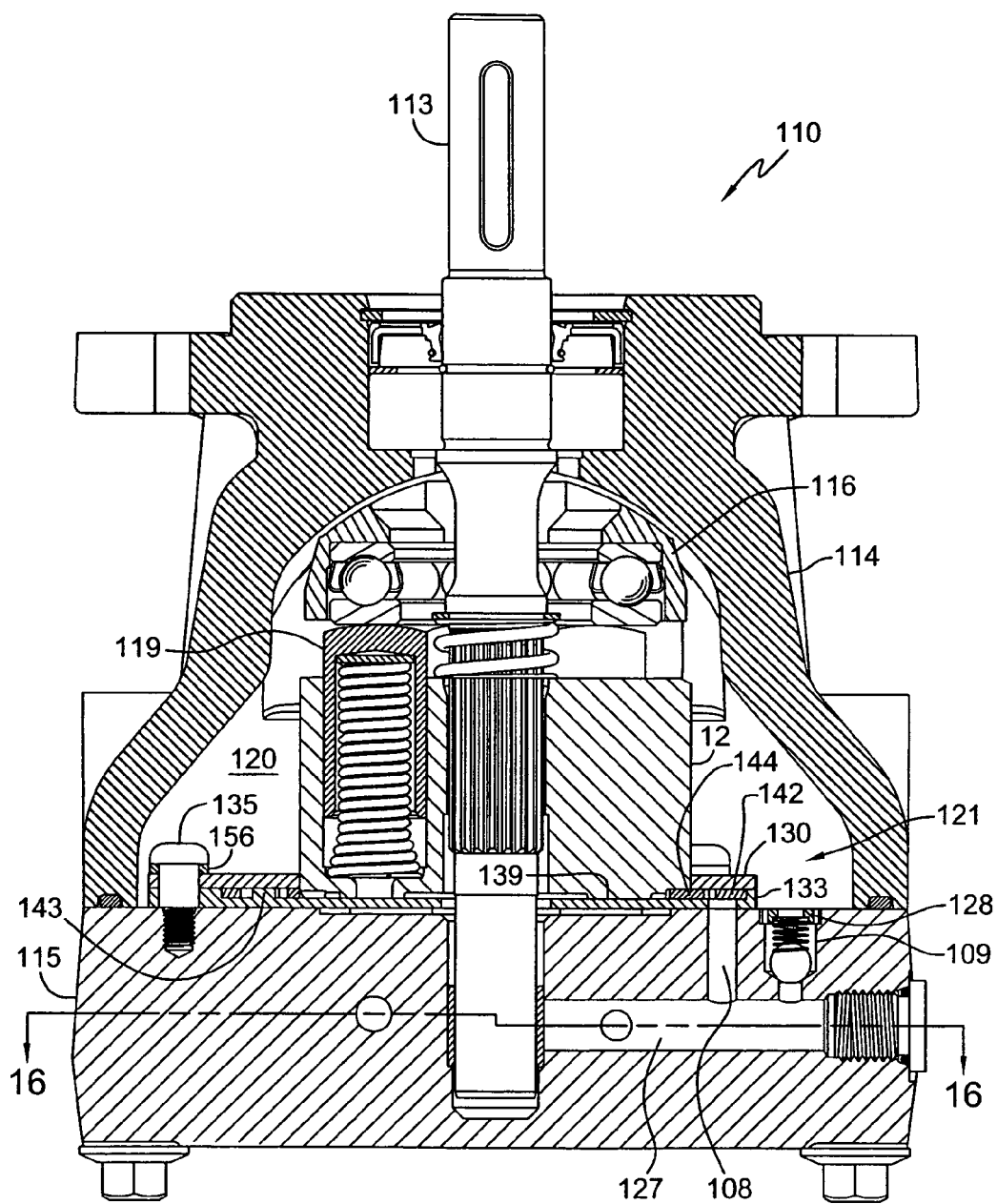
FIG. 15 is a cross-sectional side view of a hydraulic pump assembly incorporating a gerotor charge pump.

FIGS. 24 to 30 show another embodiment of this invention using a centrifugal pump. This embodiment is depicted in use in an integrated hydrostatic transaxle 60' having a hydrostatic transmission 64. Most elements of transaxle 60' in these figures are identical to those previously described. The alternative embodiment depicted in FIGS. 24 to 30 could also be used in connection with a stand-alone pump such as is shown in FIG. 15 or an HST.

Center section 132, which can be identical to center section 32 except as described herein, includes a charge gallery or sump 137 secured to the bottom thereof. As can be seen, e.g., in FIG. 25, pump running surface 33 has a pair of kidneys 34A and 34B, but it does not have a separate charge port formed therein. Rather, the charge port function is performed by upper chimney 73 formed as part of lower rotor cover 72 and lower chimney 68, which is formed as part of charge sump 137. Charge sump 137 is preferably composed of a plastic material and has a top piece 69 in which chimney 68 is integrally formed therewith and a bottom piece 77 snapped or otherwise secured to top piece 69. Top piece 69 may be secured to center section 132 by means of the check plugs (not shown) such as described previously or other means known in the art.

Figure 25:
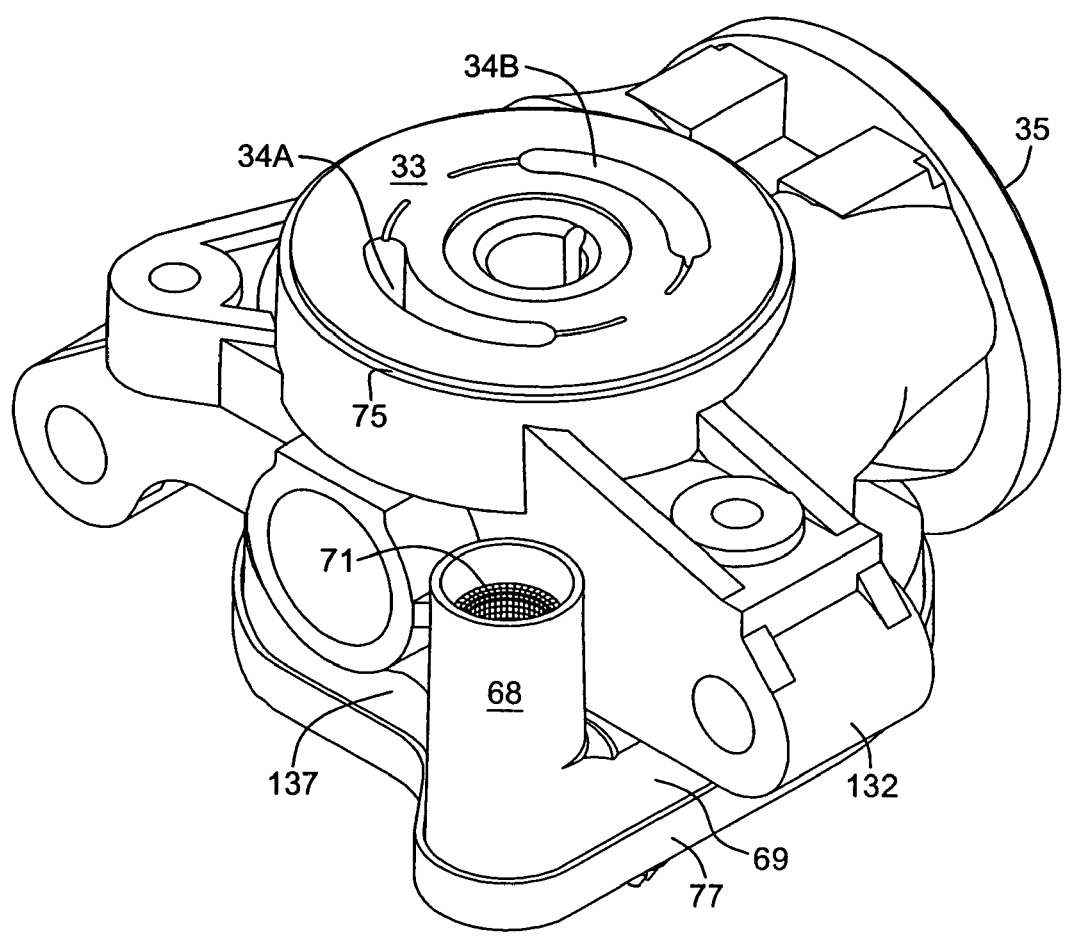
FIG. 25 is a perspective view of a center section for use in the integrated hydrostatic transaxle of FIG. 24, with the charge gallery mounted thereon.
Figure 28:
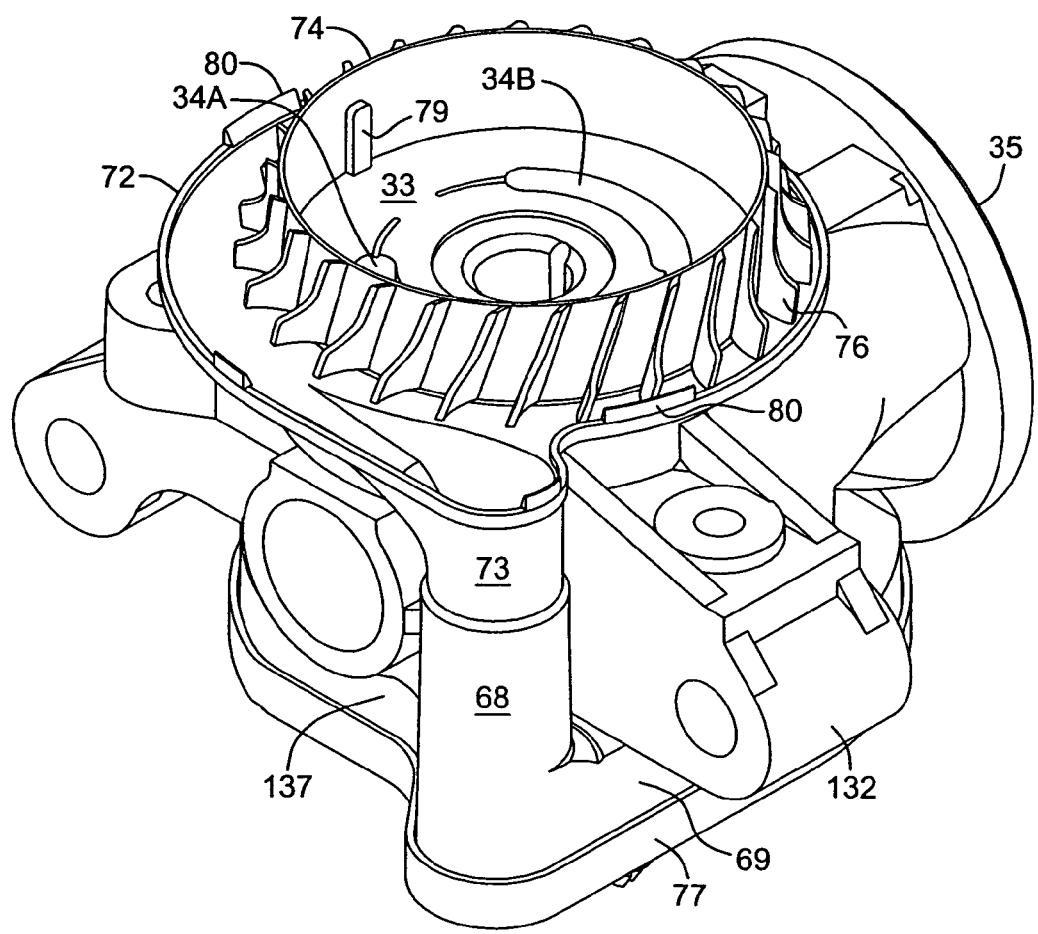
FIG. 28 is a perspective view of a center section for use in the integrated hydrostatic transaxle of FIG. 24, with a portion of the centrifugal pump mounted thereon.
Figure 29:
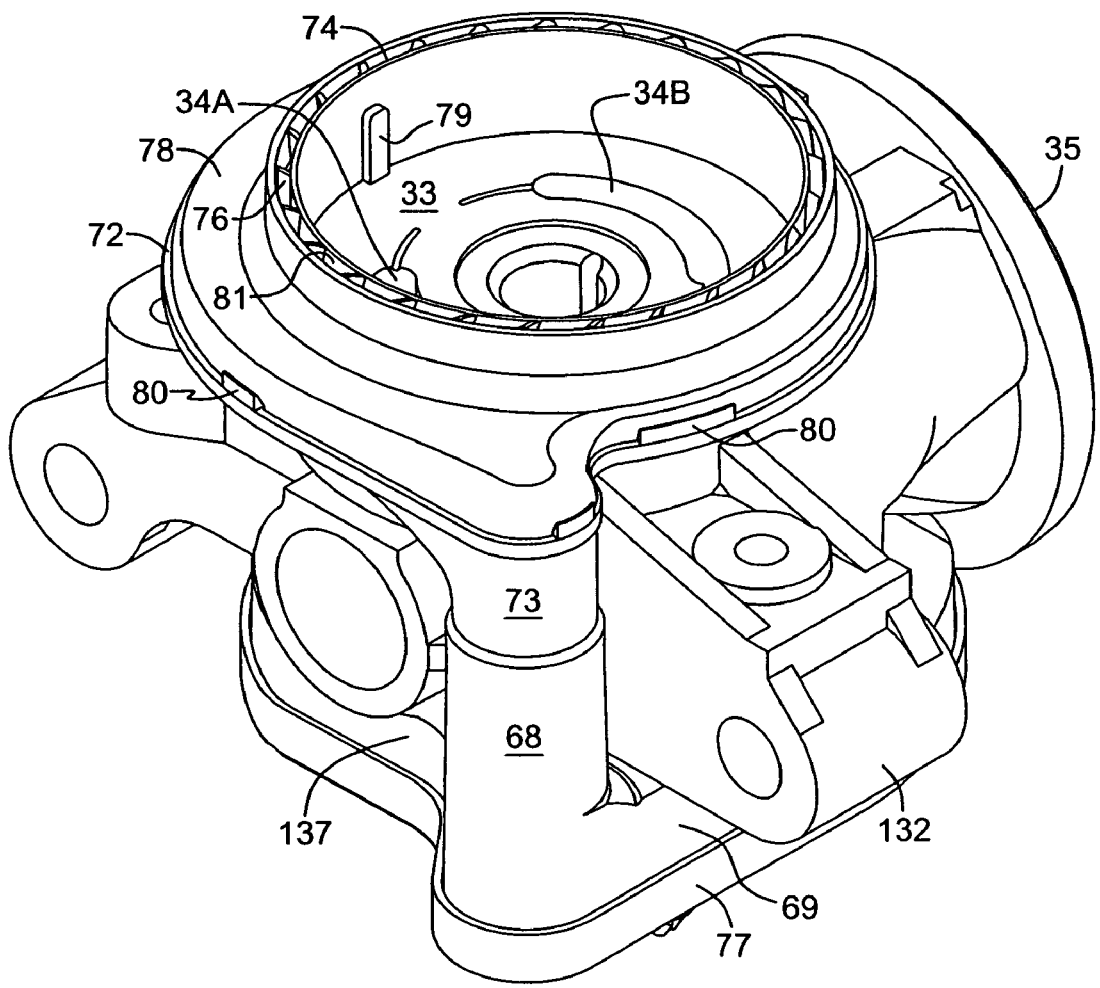
FIG. 29 is a perspective view of a center section for use in the integrated hydrostatic transaxle of FIG. 24, with a portion of the centrifugal pump mounted thereon.
Figure 30:
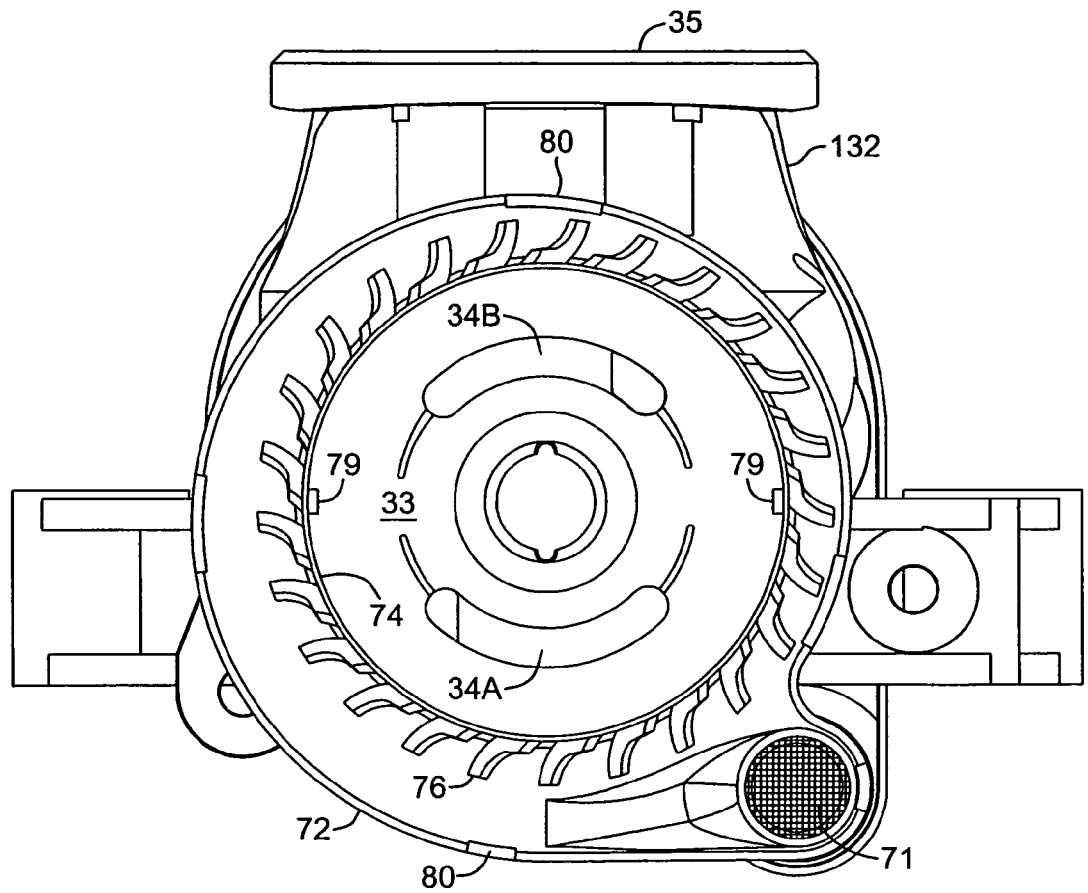
FIG. 30 is a top plan view of the center section of FIG. 25 with a portion of the centrifugal pump mounted thereon.
Figure 31:
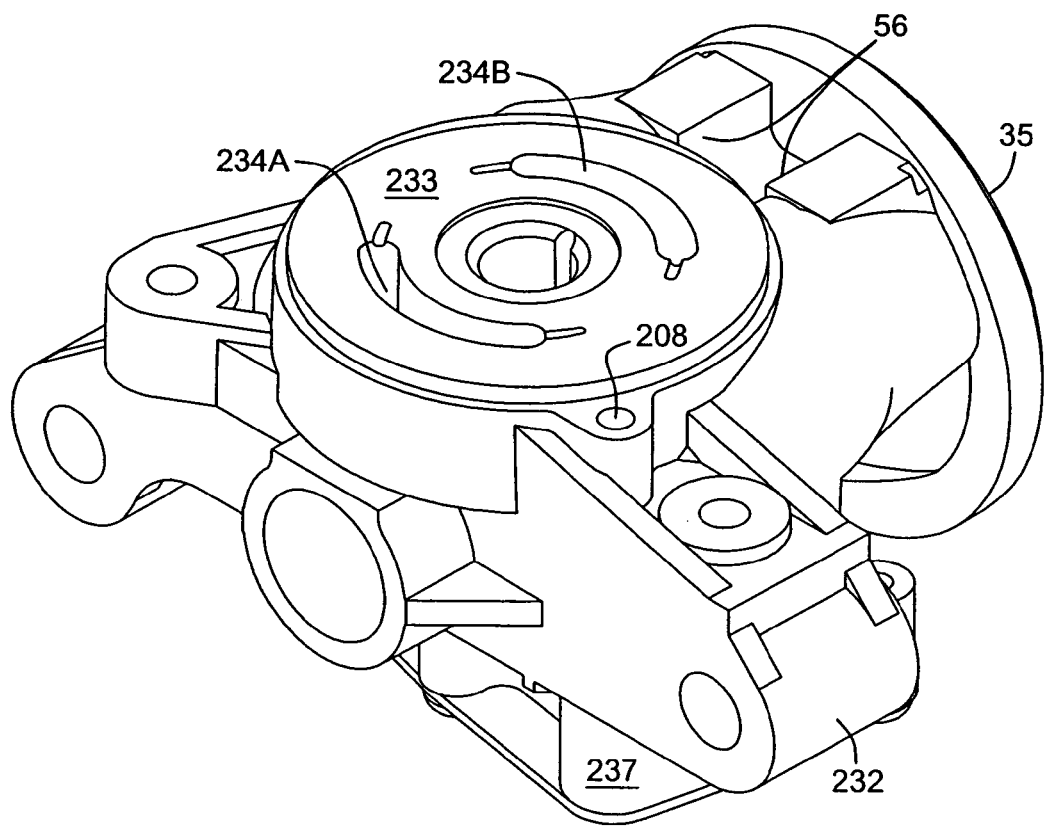
FIG. 31 is a perspective view of a center section for use in a hydrostatic transmission with a further alternative embodiment of the present invention.
Figure 32:
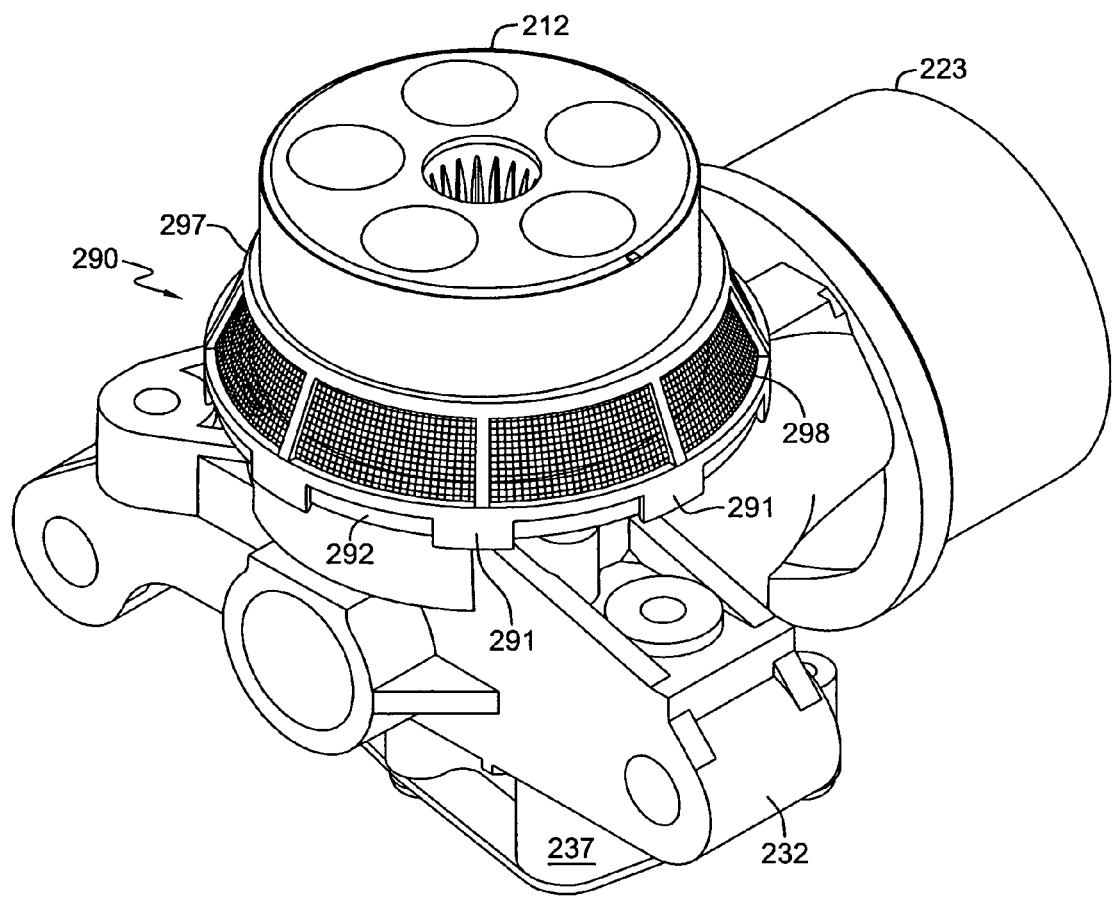
FIG. 32 is a perspective view of the center section of FIG. 31 with the flex-impeller charge pump and the pump and motor cylinder blocks mounted thereon.
Figure 33:
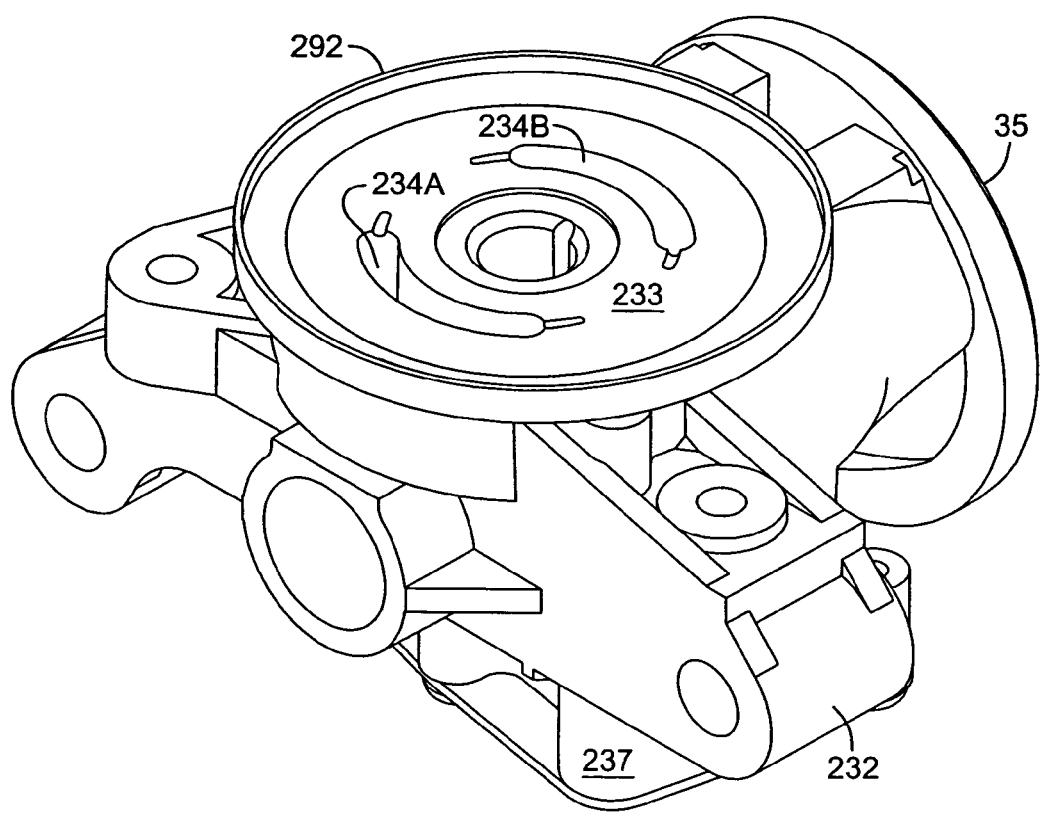
FIG. 33 is a perspective view of the center section of FIG. 31 with a portion of the flex-impeller charge pump mounted thereon.

A centrifugal pump 70 is mounted on center section 132 and comprises lower rotor cover 72, upper rotor cover 78 and rotor 74. As shown in FIGS. 25 and 28, lower rotor cover 72 is located on center section 132 by means of step 75, and rotor 74 is mounted therein. Rotor 74 has a plurality of fins 76 mounted about its outer circumference and a pair of projections 79 formed on its inner circumference to engage corresponding slots (not shown) on cylinder block 112 so that rotation of cylinder block 112 powers centrifugal charge pump 70. Furthermore, the slots on cylinder block 112 maintain the position of rotor 74, thus maintaining lower rotor cover 72 in position. When upper rotor cover 78 is secured to snaps 80 formed on lower cover 72, all the components of centrifugal pump 70 are conveniently captured and retained on center section 132.

Figure 26:
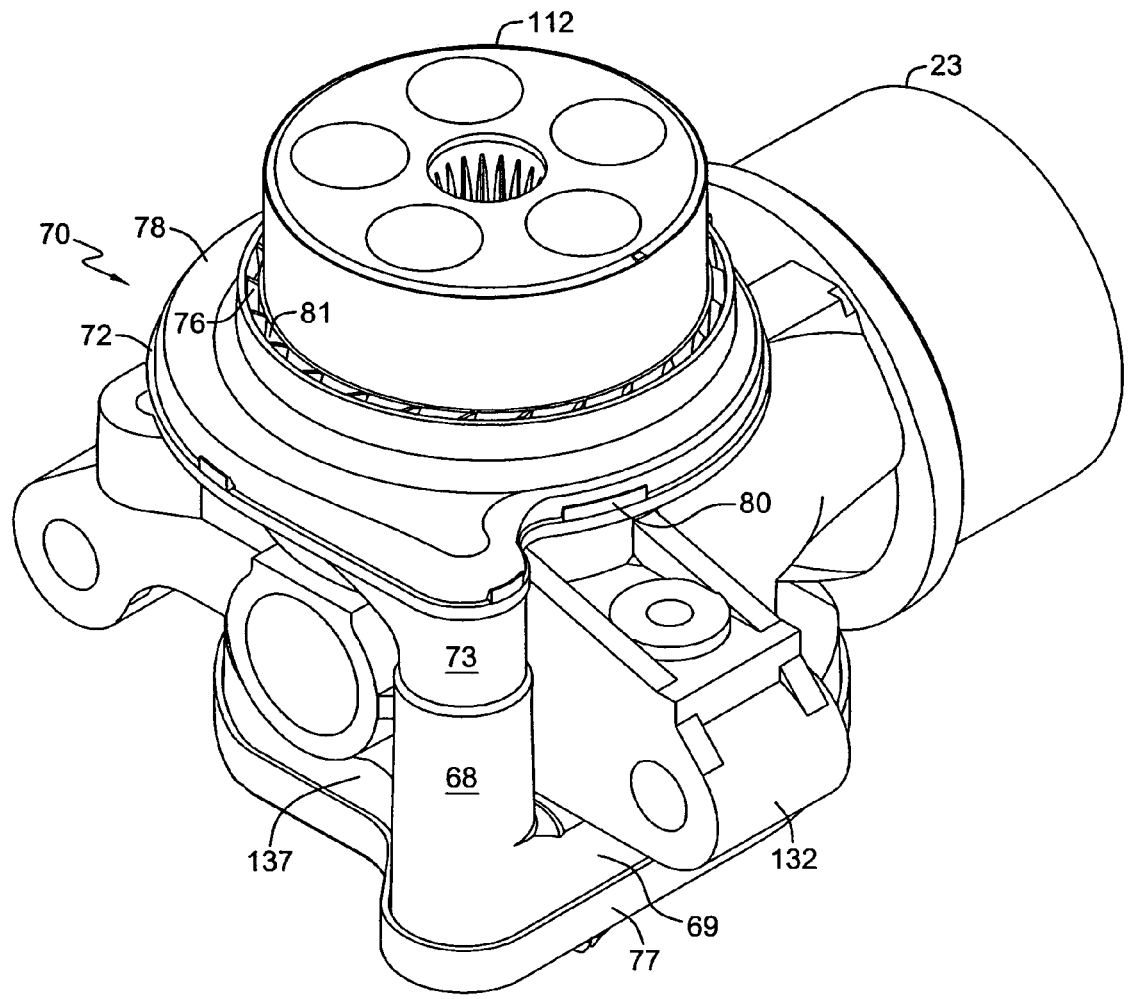
FIG. 26 is a perspective view of a centrifugal pump mounted on the center section of FIG. 25.
Figure 27:
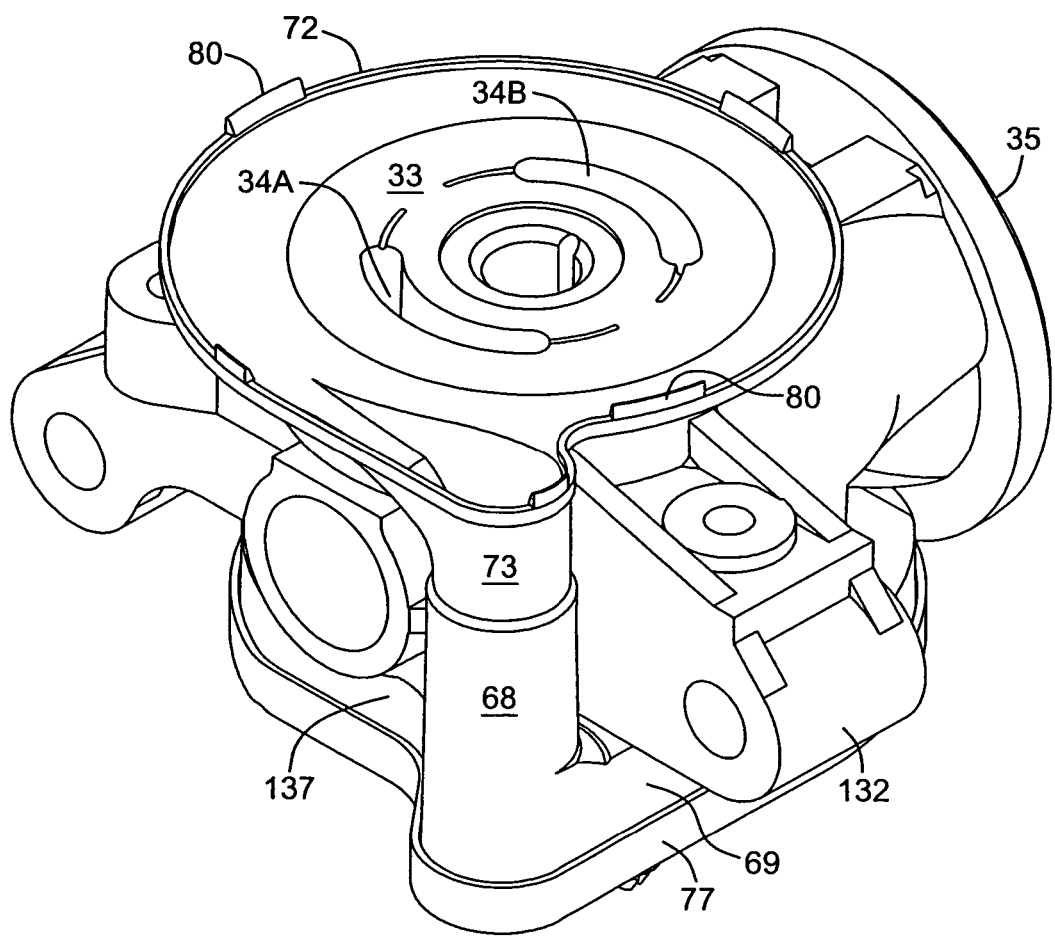
FIGS. 27 is a perspective view of a center section for use in the integrated hydrostatic transaxle of FIG. 24, with a portion of the centrifugal pump mounted thereon.

Lower rotor cover 72 has a mating portion 73 formed therewith to mate to chimney 68 to provide fluid from centrifugal pump 70 to charge gallery 137. As seen in FIG. 26, openings 81 are created between upper rotor cover 78 and cylinder block 112, whereby hydraulic fluid is pulled therethrough by action of centrifugal pump 70 and pressurized to flow through chimney 68 into charge gallery 137, thus providing pressurized fluid to low pressure side of the hydraulic circuit as described above.

A mesh filter 71 may be mounted in chimney 68 to filter fluid being passed from centrifugal pump 70 to charge gallery 137. It will be understood that filter 71 could be moved adjacent to openings 81 to filter the hydraulic fluid before it is pulled into pump 70.

The charge feature of the present invention could also be provided by a flexible impeller driven by the pump block. In a further embodiment of this invention depicted in FIGS. 31 to 36, flex impeller pump 290 is shown mounted on center section 232 and driven by pump cylinder block 212. Pump cylinder block 212 is mounted on pump running surface 233 and is in communication with kidneys 234A and 234B. Port 208 connects charge pump 290 to gallery 237. Motor cylinder block 223 is also mounted on center section 232.

Figure 34:
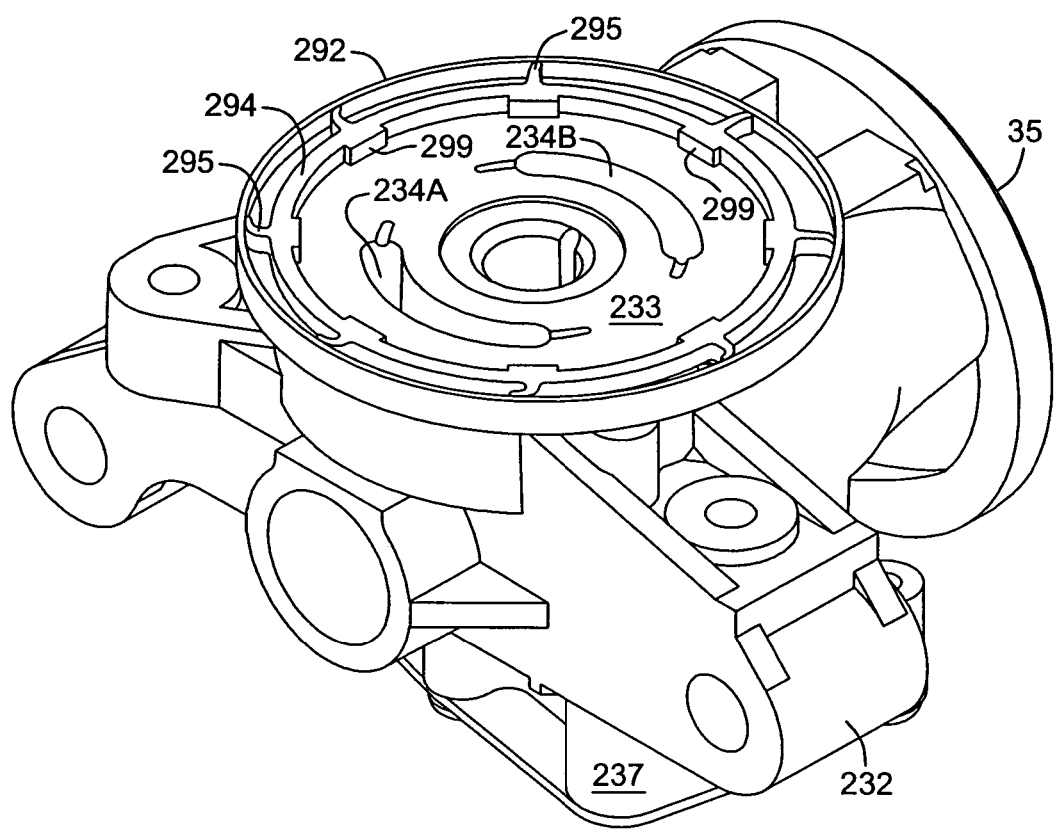
FIG. 34 is a perspective view of the center section of FIG. 31 with a portion of the flex-impeller charge pump mounted thereon.
Figure 35:
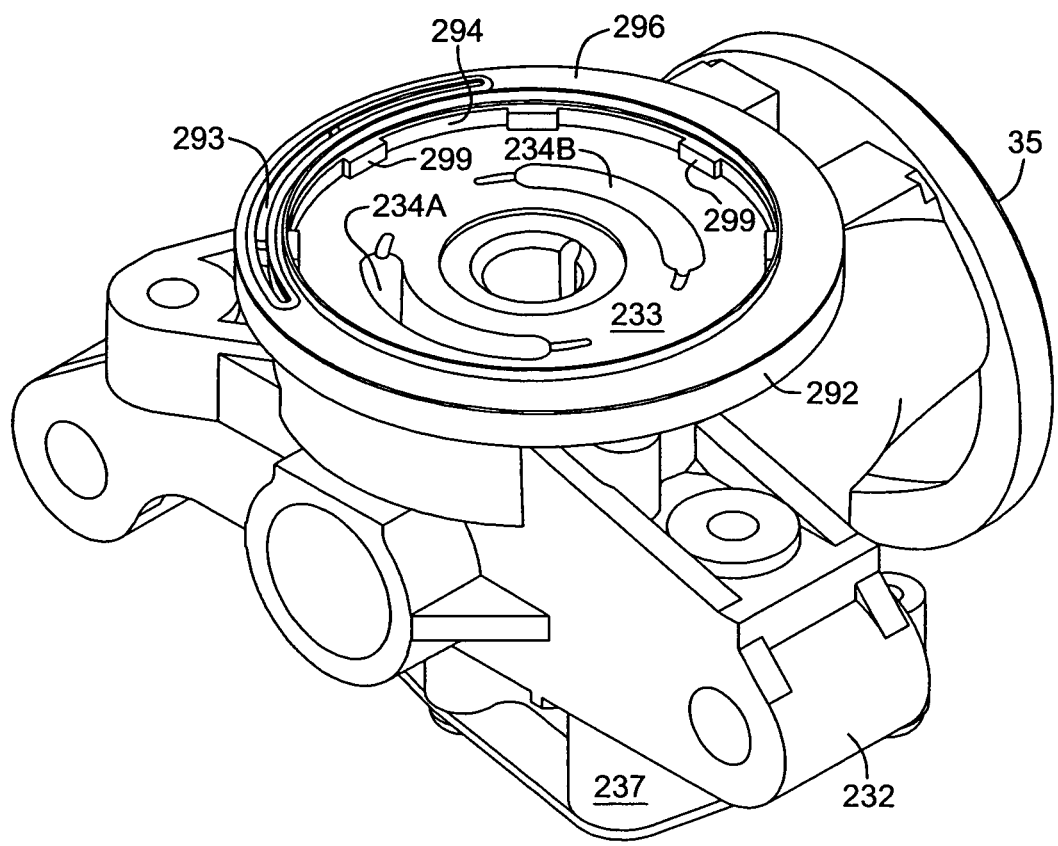
FIG. 35 is a perspective view of the center section of FIG. 31 with a portion of the flex-impeller charge pump mounted thereon.
Figure 36:
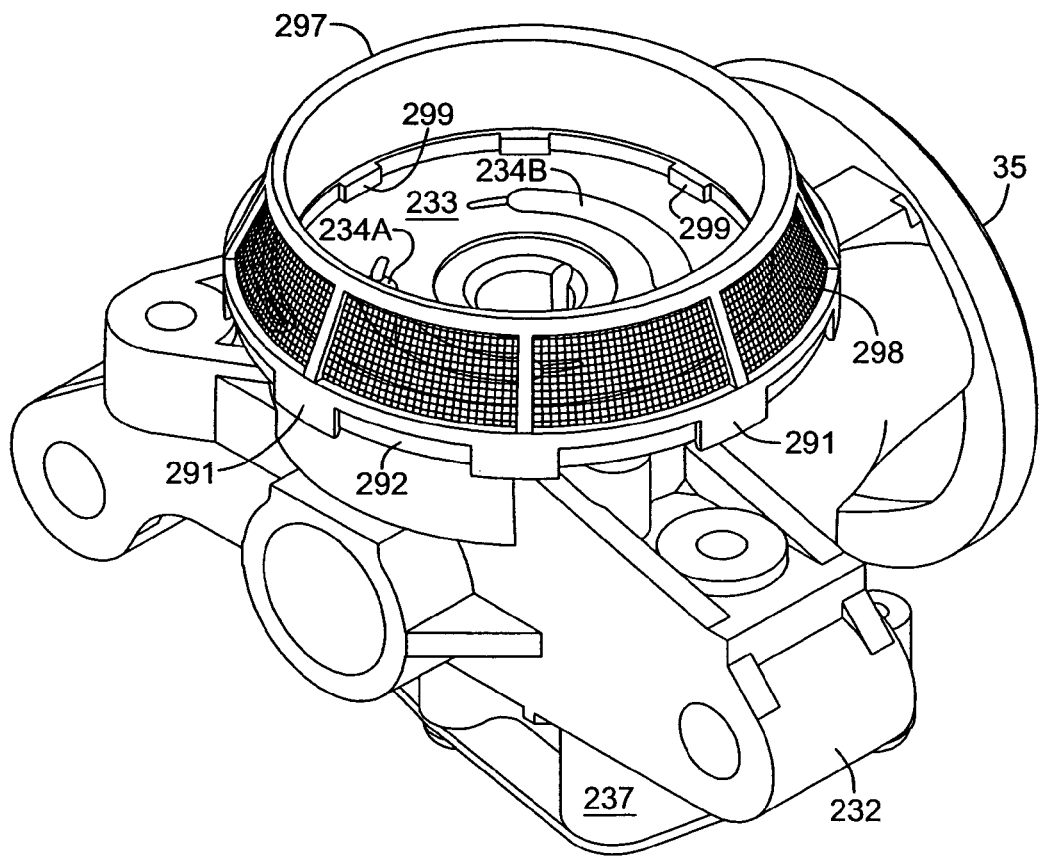
FIG. 36 is a perspective view of the center section of FIG. 31 with a portion of the flex-impeller charge pump mounted thereon.

The specific construction of this embodiment is best shown by a comparison of FIGS. 33, 34, 35 and 36, which show the apparatus in various stages of assembly. Impeller pump 290 comprises an upper impeller plate 296 mounted to lower impeller plate 292, which is mounted to center section 232 adjacent running surface 233 for cylinder block 212. An impeller 294 is mounted in lower impeller plate 292, as shown in FIG. 34, and comprises a generally circular flexible member having a series of fins 295 formed about the outer circumference thereof and a series of projections 299 formed on the inner circumference thereof. Filter housing 297 is mounted to upper impeller plate 296 with snaps 291 that extend below and lock onto lower impeller plate 292, and mesh filter 298 acts to filter out impurities in the hydraulic fluid being pulled into impeller pump 290. Oil is pulled through filter housing 297 and into the opening 293 formed in upper impeller plate 296. The oil is then pushed through port 208 into charge gallery 237, as described previously. An anti-rotation surface 56 may be formed on center section 232 to mate with a corresponding tab (not shown) on lower impeller plate 292, to prevent rotation of the charge pump.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention, which is to be given the full breadth of the appended claims and any equivalents thereof.

We claim:

1. A hydraulic drive apparatus, comprising:
   a housing forming an oil sump;
   a center section mounted in the sump and comprising a pump running surface and a motor running surface formed thereon and hydraulic porting formed therein;
   a rotatable pump cylinder block mounted on the pump running surface and a rotatable motor cylinder block mounted on the motor running surface, wherein the pump cylinder block and motor cylinder block are hydraulically connected through the hydraulic porting;
   a pair of check valves mounted in the center section;
   an oil gallery located adjacent to the check valves and separate from the oil sump; and
   a charge pump located in a charge pump plate mounted on the center section adjacent to and separate from the pump cylinder block, wherein the charge pump is in fluid communication with both the oil sump and the oil gallery, and the charge pump is powered by rotation of the pump cylinder block and provides pressurized fluid to the oil gallery.

2. A hydraulic drive apparatus as set forth in claim 1, wherein the charge pump comprises a gerotor pump.

3. A hydraulic drive apparatus as set forth in claim 1, further comprising a filter member associated with the charge pump to filter fluid being pulled from the oil sump into the charge pump.

4. A hydraulic drive apparatus as set forth in claim 1, wherein the charge pump comprises a pair of rotors mounted inside the charge pump plate, and one of the rotors is engaged to and driven by the pump cylinder block.

5. A hydraulic drive apparatus as set forth in claim 4, further comprising a plurality of notches formed on the external radius of the hydraulic pump cylinder block to engage a corresponding plurality of projections formed on one of the charge pump rotors to transfer rotational force from the pump cylinder block to the charge pump.

6. A hydraulic drive apparatus as set forth in claim 4, further comprising a plurality of projections formed on the pump cylinder block, each projection engaged to a corresponding notch on one of the charge pump rotors.

7. A hydraulic drive apparatus as set forth in claim 1, wherein the axis of rotation of the pump cylinder block is perpendicular to the axis of rotation of the motor cylinder block.

8. A hydraulic drive apparatus as set forth in claim 1, wherein the oil gallery is secured to the center section by the check valves.

9. A hydraulic drive apparatus as set forth in claim 1, wherein the hydraulic porting formed in the center section further comprises a separate port connecting the charge pump to the oil gallery.

10. A hydraulic drive apparatus as set forth in claim 1, wherein the charge pump comprises a centrifugal pump.

11. A hydraulic drive apparatus as set forth in claim 10, further comprising a charge port external to the center section.

12. A hydraulic drive apparatus as set forth in claim 11, wherein a portion of the oil gallery extends towards and joins with a portion of the charge pump plate to form a separate charge port external to the center section.

13. A hydraulic drive apparatus having a housing forming an oil sump, comprising:
    a porting block mounted in the oil sump and comprising a pump running surface and hydraulic porting;
    a pump cylinder block mounted on the pump running surface and in fluid communication with a motor cylinder block through the hydraulic porting;
    an oil gallery located adjacent to the porting block and separate from the oil sump;
    a charge pump housing mounted on the porting block adjacent to and separate from the pump cylinder block, and
    a charge pump mounted in the charge pump housing, wherein the charge pump is in fluid communication with both the oil sump and the oil gallery, the charge pump comprising a rotatable element drivingly engaged to the pump cylinder block.

14. A hydraulic drive apparatus as set forth in claim 13, wherein the charge pump comprises a gerotor pump having a pair of rotors mounted inside the charge pump housing, and one of the rotors is engaged to and driven by the pump cylinder block.

15. A hydraulic drive apparatus as set forth in claim 14, further comprising a filter member associated with the charge pump to filter fluid being pulled from the oil sump into the charge pump.

16. A hydraulic drive apparatus as set forth in claim 14, further comprising a plurality of notches formed on the external radius of the hydraulic pump cylinder block to engage a corresponding plurality of projections formed on one of the charge pump rotors to transfer rotational force from the pump cylinder block to the charge pump.

17. A hydraulic drive apparatus as set forth in claim 14, further comprising a plurality of projections formed on the pump cylinder block, each projection engaged to a corresponding notch on one of the charge pump rotors.

18. A hydraulic drive apparatus as set forth in claim 13, wherein the oil gallery is secured to the porting block by check valves and the hydraulic porting formed in the porting block further comprises a separate port connecting the charge pump to the oil gallery.

19. A hydraulic drive apparatus as set forth in claim 13, wherein the charge pump comprises a centrifugal pump.

20. A hydraulic drive apparatus as set forth in claim 19, further comprising a charge port external to the porting block.

21. A hydraulic drive apparatus as set forth in claim 20, wherein a portion of the oil gallery extends towards and joins with a portion of the charge pump housing to form a separate charge port external to the center section.

22. A hydraulic drive apparatus having a housing forming an oil sump, comprising:
    a porting block mounted in the oil sump and having hydraulic porting formed therein;
    a pump cylinder block mounted on the porting block and in fluid communication with the hydraulic porting; and
    a charge pump comprising a separate charge pump housing mounted on the porting block adjacent to the pump cylinder block, wherein the charge pump is engaged to and driven by the pump cylinder block to provide pressurized fluid to the hydraulic porting.

23. A hydraulic drive apparatus as set forth in claim 22, wherein the charge pump comprises a gerotor pump.

24. A hydraulic drive apparatus, comprising:
a housing forming an oil sump;
a center section mounted in the sump and comprising a pump running surface formed on one side of the center section, a motor running surface formed on another side of the center section and hydraulic porting formed therein;
a rotatable pump cylinder block mounted on the pump running surface and a rotatable motor cylinder block mounted on the motor running surface, wherein the pump and motor are hydraulically connected through at least a portion of the hydraulic porting;
an oil gallery located adjacent to the center section and separate from the oil sump;
a pair of check valves located in the center section between the oil gallery and the hydraulic porting; and
a charge pump mounted on the center section adjacent to and separate from the pump cylinder block, wherein the charge pump is in fluid communication with both the oil sump and the oil gallery through a portion of the hydraulic porting, and the charge pump is powered by rotation of the pump cylinder block to provide pressurized fluid to the oil gallery.

25. An axle driving apparatus, comprising:
a housing forming an oil sump;
a center section mounted in the sump;
hydraulic porting formed in the center section and comprising first, second and third ports;
a rotatable pump cylinder block and a rotatable motor cylinder block mounted on the center section, wherein the pump cylinder block and motor cylinder block are hydraulically connected through the first and second ports of the hydraulic porting;
an input shaft extending into the housing and driving the pump cylinder block;
an oil gallery located adjacent to the center section and separate from the oil sump;
a pair of check valves located in the center section between the oil gallery and the first and second ports of the hydraulic porting; and
a charge pump comprising a charge pump housing mounted on the center section adjacent to the pump cylinder block in fluid communication with the oil sump and the oil gallery, wherein the charge pump is powered by rotation of the pump cylinder block and provides pressurized fluid to the oil gallery through the third port of the hydraulic porting.

26. An axle driving apparatus as set forth in claim 25, further comprising:
a motor shaft engaged to and driven by the motor cylinder block;
a gear train driven by the motor shaft and comprising a differential; and
a pair of output axles mounted in and extending from opposite sides of the housing, wherein the axles are driven by the differential.

27. An axle driving apparatus as set forth in claim 26, wherein the output axles are mounted generally perpendicular to the input shaft.

28. A charge pump for a hydraulic drive apparatus having a center section mounted in a sump and a hydraulic pump cylinder block mounted on a pump running surface formed on the center section, the charge pump comprising:
a first rotor plate fixedly mounted on the center section adjacent to the pump running surface and a second rotor plate secured to the top of the first rotor plate to create a charge area;
an outer gerotor ring mounted in the first rotor plate; and
an inner gerotor ring mounted in the first rotor plate inside the outer gerotor ring, the inner gerotor ring engaged to an external surface of the pump cylinder block to rotate therewith so that the inner and outer gerotor rings cooperate to pressurize fluid in the charge area.

29. A charge pump for a hydraulic drive apparatus having a center section mounted in a sump and a hydraulic pump cylinder block mounted on a pump running surface formed on the center section, the charge pump comprising:
a first rotor plate fixedly mounted on the center section adjacent to the pump running surface;
a second rotor plate secured to the top of the first rotor plate to create a charge area, the second rotor plate comprising an opening therein to permit hydraulic fluid to be pulled into the charge area;
a gerotor pump mounted in the first rotor plate and comprising an outer gerotor ring and an inner gerotor ring engaged thereto, the inner gerotor ring engaged to an external surface of the pump cylinder block to rotate therewith.

30. A charge pump for a hydraulic drive apparatus having a center section mounted in a sump and a hydraulic pump cylinder block mounted on a pump running surface formed on the center section, the charge pump comprising:
a rotor plate mounted on the center section;
a pair of gerotor rings mounted in the rotor plate, wherein one of the gerotor rings is engaged to and driven by the pump cylinder block; and
a filter member connected to the rotor plate to filter hydraulic fluid being pulled from the sump into the charge pump.

31. A charge pump as set forth in claim 30, wherein the rotor plate comprises a bottom piece mounted on the center section and a top piece secured to the bottom piece.

32. A charge pump as set forth in claim 31, further comprising a wave spring between the filter member and the top piece of the rotor plate.

33. A charge pump as set forth in claim 31, further comprising an opening formed in the top piece of the rotor plate.

34. A hydraulic drive apparatus comprising:
a support member comprising a hydraulic circuit formed therein, a pump running surface having a p air of openings to the hydraulic circuit, and a pair of check valve openings to the hydraulic circuit, wherein the support member is mounted to a housing member to form a sump;
a fluid gallery adjacent to the check openings in the support member;
a rotatable pump cylinder block mounted on the support member and in communication with the hydraulic circuit; and
a charge pump mounted on the support member adjacent the pump cylinder block, where the charge pump is powered by rotation of the pump cylinder block and provides hydraulic fluid from the sump to the fluid gallery.

35. A hydraulic device as set forth in claim 34, wherein the support member further comprises a valve plate mounted on the pump running surface between the support member and the pump cylinder block.

36. A hydraulic device as set forth in claim 35, wherein a portion of the support member extends outside the housing member.

* * * * *